United States Patent
Onno et al.

(10) Patent No.: US 11,356,700 B2
(45) Date of Patent: Jun. 7, 2022

(54) 360-DEGREE VIDEO ENCODING WITH BLOCK-BASED EXTENSION OF THE BOUNDARY OF PROJECTED PARTS

(71) Applicant: CANON KABUSHIKI KAISHA, Tokyo (JP)

(72) Inventors: Patrice Onno, Rennes (FR); Guillaume Laroche, Saint Aubin d'Aubigne (FR); Jonathan Taquet, Talensac (FR); Christophe Gisquet, Acigne (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/627,260

(22) PCT Filed: Jun. 22, 2018

(86) PCT No.: PCT/EP2018/066784
§ 371 (c)(1),
(2) Date: Dec. 27, 2019

(87) PCT Pub. No.: WO2019/002134
PCT Pub. Date: Jan. 3, 2019

(65) Prior Publication Data
US 2020/0137418 A1   Apr. 30, 2020

(30) Foreign Application Priority Data

Jun. 30, 2017  (GB) ...................... 1710568

(51) Int. Cl.
*H04N 19/597* (2014.01)
*H04N 19/119* (2014.01)
(Continued)

(52) U.S. Cl.
CPC ......... *H04N 19/597* (2014.11); *G06T 3/0037* (2013.01); *H04N 19/119* (2014.11); *H04N 19/176* (2014.11); *H04N 19/184* (2014.11)

(58) Field of Classification Search
None
See application file for complete search history.

(56) References Cited

U.S. PATENT DOCUMENTS

2015/0163509 A1* 6/2015 Hsu ...................... H04N 19/583
375/240.16
2016/0112713 A1* 4/2016 Russell ................. H04N 19/20
375/240.03

(Continued)

OTHER PUBLICATIONS

Lee, Y., et al., "AHG 8: EAP-Based Segmented Sphere Projection With Padding" ITU-T SG 16 WP 3 and ISO/IEC JTC1/SC29 WG11, Mar. 31-Apr. 7, 2017, Hobart, AU, Doc.: JVET-F0052, pp. 1-9 (Mar. 23, 2017) (Year: 2017).*

(Continued)

*Primary Examiner* — Lindsay J Uhl
(74) *Attorney, Agent, or Firm* — Canon U.S.A., Inc. IP Division

(57) ABSTRACT

The invention relates to the encoding of spherical 360-degree videos using 2D block-based encoders. The encoding requires a spherical 360-degree image to be projected onto a projection subpart of a 2D image, using for instance CMP, OHP, ISP, TSP, SSP or RSP techniques. The boundary of the projected image may then be extended, within the 2D image, into an extended block-based boundary portion based on the block structure used by the 2D encoder to then encode the 2D image. The boundary extension may be set along block edges in the vicinity of the projected image. The extended pixels added to the projected image may be padding pixels with values set based on continuing 360-degree image projection or based on neighboring pixels. More homogenous blocks can be obtained for better compression by the encoder, while the seam artefacts resulting from discontinuity between projected subparts of the 360-degree image are reduced.

22 Claims, 8 Drawing Sheets

(51) Int. Cl.
H04N 19/176 (2014.01)
H04N 19/184 (2014.01)
G06T 3/00 (2006.01)

(56) References Cited

U.S. PATENT DOCUMENTS

2017/0214937 A1* 7/2017 Lin ................. H04N 19/563
2018/0376153 A1* 12/2018 Gokhale ............ H04N 19/137
2019/0215532 A1* 7/2019 He .................. H04N 13/117
2020/0045336 A1* 2/2020 Xiu ................. H04N 19/563

OTHER PUBLICATIONS

Lee, Y., et al., "AHG 8: EAP-based segmented sphere projection with padding", Joint Video Exploration Team (JVET) of ITU-T SG 16 WP 3 and ISO/IEC JTC 1/SC 29/WG 11, 6th Meeting: Hobard, AU, Mar. 31-Apr. 7, 2017, Doc. No. JVET-F0052, pp. 1-9, (Mar. 23, 2017) (Year: 2017).*
Lee, Y., et al., "AHG 8: EAP-based segmented sphere projection with padding", Joint Video Exploration Team (JVET) of ITU-T SG 16 WP 3 and ISO/IEC JTC 1/SC 29/WG 11, 6 Meeting: Hobard, AU, Mar. 31-Apr. 7, 2017, Doc. No. JVET-FOO52, pp. 1-9, (Mar. 23, 2017) (Year: 2017).*
Yan Ye et al., "Algorithm Descriptions of Projection Format Conversion and Video Quality Metrics in 360LIB" ISO/IEC JTC1/SC29/WG11/N16888, Apr. 2017, Hobart, AU pp. 1-32.
Ya-Hsuan Lee et al., "AHG 8: EAP-Based Segmented Sphere Projection WIH Padding" ITU-T SG 16 WP 3 and ISO/IEC JTC1/SC29 WG 11, Mar. 31-Apr. 7, 2017, Hobart, AU pp. 1-9.

* cited by examiner

360-DEGREE VIDEO ENCODING WITH BLOCK-BASED EXTENSION OF THE BOUNDARY OF PROJECTED PARTS

CROSS REFERENCE TO RELATED APPLICATION

The present application is a National Phase application of International Patent Application No. PCT/EP2018/066784, filed Jun. 22, 2018, entitled "360-DEGREE VIDEO ENCODING WITH BLOCK-BASED EXTENSION OF THE BOUNDARY OF PROJECTED PARTS", which claims priority to United Kingdom Patent Application No. 1710568.5, filed on Jun. 30, 2017, all of which are hereby expressly incorporated by reference herein in their entirety.

FIELD OF THE INVENTION

The present invention relates generally to the encoding of 360-degree videos using an encoding device and more particularly to methods and devices for encoding a spherical 360-degree video using 2D (two-dimension) encoding techniques.

BACKGROUND OF THE INVENTION 360-degree videos are generally related to sphere representations representing videos that are observed from the centre of the sphere.

Known techniques for encoding a spherical video use 3D-to-2D conversions where the spherical 360-degree image is projected onto a 2D image. The conversion or projection maps all the 3D points of the space onto a 2D representation.

Next, the obtained 2D image is encoded using known 2D video encoding schemes, such as HEVC. This allows a reasonable amount of data to be sent. The encoded 2D image is next used at a decoder side to reconstruct the spherical 360-degree image.

Several 3D-to-2D projections are available. Most of them are systematic transformations of the latitude and longitude of a position from the surface of the sphere into a position on the 2D plane. Different areas of the sphere are sampled at different densities on the 2D plane. It results that the 3D-to-2D projections necessarily distort the surface in some extent. For example, the commonly used ERP (standing for Equi-Rectangular Projection) format oversamples the sphere at the poles, resulting in over-stretched top and bottom areas on the ERP picture.

Some 3D-to-2D projections map the spherical 360-degree image onto the whole 2D image. The whole 2D image is said to be an "active" area, meaning that each and every of its pixels correspond to a projected pixel from the spherical image.

Sometimes, the whole spherical image is considered as a single piece and mapped onto the entire 2D image (for instance for ERP and EAP—standing for Equal Area Projection). It is said that the projection format has only one face. Sometimes, the spherical image is split into several complementary portions (the "faces" of the spherical image) which are projected onto respective projection subparts of the 2D image (for instance for Cubic Map Projection—CMP, OctaHedron Projection—OHP, Icosahedron Projection—ISP or Truncated Square Pyramid Projection—TSP).

Other 3D-to-2D projections map the entire spherical 360-degree image onto a subpart only of the 2D image. In practice, the spherical 360-degree image is split into complementary pieces and each piece is mapped onto a corresponding projection subpart splitting the 2D image. The sum of these projection subparts (which do not entirely fill the 2D image) forms the "active" area of the 2D image, whereas the remainder of the 2D image forms the "inactive" area of the 2D image (i.e. pixels not corresponding to a projected pixel from the spherical image). It thus requires padding samples (e.g. bits) to be added in the "inactive" area, in order to obtain an entire rectangular 2D image for 2D encoding. Exemplary projections include the Segmented Sphere Projection (SSP) and the Rotated Sphere Projection (RSP).

One drawback with the 3D-to-2D projection is that "seam" artefacts may appear in the reconstructed spherical 360-degree image at the decoding side. The seam artefacts are due to the lossy nature of the 2D encoding scheme used, because the latter performs different encoding to neighbouring pixels from the two sides where the spherical 3D image is cut (to form a single piece to project or to form several spherical pieces).

Some techniques are used to reduce the "seam" artefact.

When the spherical 360-degree image is projected onto a projection subpart only of a 2D image, mapping techniques are used that mainly consist in adding samples (e.g. pixels) in the inactive area of the projection to provide a better quality on the "seam" border of the projection For instance, JVET contribution referenced JVET-F0052 discloses an EAP-based segmented sphere projection with padding, in which a padding region is generated in the inactive area surrounding a "pole", i.e. a circular elementary subpart of the 2D image onto which a pole of the spherical image is projected.

The padding region has a specified padding radius (e.g. 32 pixels), and the value of each padding pixel of this region takes the value of the pixels of the spherical 360-degree image having the same longitude with the latitude corresponding to the boundary of the "pole" (usually ±45° depending on whether it is the north or south pole concerned). It means the circular elementary subpart "pole" is extended by additional 32 pixels (forming a boundary portion) having more or less the same pixel value as the outer pixels of the "pole".

These padding pixels in the padding region are then blended with inactive pixels according to the distance to the boundary of the pole and the distance to the inactive region. This introduces pole blurring in the padding region.

The padding techniques generally improve the visual "seam" artefacts. However, they also affect 360-degree video coding efficiency by adding additional information.

SUMMARY OF INVENTION

The present invention seeks to overcome the aforementioned drawbacks, by providing a new padding technique which reduces visual "seam" artefacts while improving 360-degree video coding efficiency.

An idea of the present invention is to define the padding region taking into account the properties of the 2D video encoding scheme in order to improve coding efficiency of this region while having reduction of the seam artefacts.

In this context, the present invention provides a method of encoding a spherical 360-degree video in an encoding device, comprising the following steps performed by a microprocessor of the encoding device:

projecting a spherical 360-degree image onto a projection subpart of a 2D image, extending, within the 2D image, a boundary portion of the projection subpart into an extended block-based boundary portion based on a block structure, encoding the extended 2D image by a block-based encoder using the block structure.

Here the projection subpart (active area or active subarea) is extended in the inactive area by an extending portion built based on the block structure used by the 2D encoder.

Thanks to the extension, the encoding of the boundary portion is made closer to what should have been obtained without cutting the spherical 360-degree image along this portion. "Seam" artefacts are thus reduced.

Furthermore, the extending block-based boundary portion is now made of blocks that are each made more homogeneous (compared to blocks that included inactive pixels in the prior art), thereby improving compression. Also, the remainder of the inactive area (excluding the extending portion) may thus be made of full blocks of by-default value pixels, thereby ensuring an efficient encoding to be obtained.

Correspondingly, the invention also provides a device for encoding a spherical 360-degree video, the device comprising at least one microprocessor configured for carrying out the steps defined above.

Optional features are defined in the appended claims with reference to methods. Of course, same features can be transposed into system features dedicated to any device according to embodiments of the invention.

In embodiments, the extended block-based boundary portion matches a block grid used by the block-based encoder. The extended portion is thus crenelated following block boundaries of the block structure.

To match the block grid, both the encoder and a boundary extender use the same grid origin. In other words, the two block grids or structures used are aligned.

In embodiments, the method further comprises:

obtaining an outward strip along the boundary portion (i.e. a strip in the inactive area outside the projection subpart), determining blocks of the block structure having pixels in the outward strip (optionally without overlapping outside the strip in the inactive area), and defining the extended block-based boundary portion based on the determined blocks.

This makes it possible to easily control the size of the extending portion, thereby the coding costs for the extension.

As a variant, it may be determined blocks of the block structure that partially overlap the boundary portion (and thus also overlap the inactive area), to include them in the extended portion. In others words, only the incomplete blocks of the projection subpart (with respect to the grid of the block structure) may be completed using padding.

In specific embodiments, determining blocks of the block structure includes determining blocks that overlap the outward strip while not extending beyond the outer edge of the outward strip.

In other specific embodiments, the extended block-based boundary portion is defined by the outer, with respect to the projection subpart, edges of the determined blocks. This makes it possible to define the limits of the extended portion along the block boundaries in the block grid.

In yet other specific embodiments, the boundary portion is a circular portion with radius R, and the outward strip is defined between the circular portion and an outer circular portion (having the same center) with radius $R_E$ higher than R.

For instance, $R_E$ belongs to ]R; A.R], where A is at most 1.1.

In yet other specific embodiments, the outward strip is defined along the boundary portion to have a maximum width, e.g. less or equal to the diagonal of the largest block in the block structure. This is to limit the extension of the boundary portion to encompass only blocks of the block structure/grid that were partially included in the active area. Therefore, it is avoided adding new entire blocks in the extending portion that would substantially increase the coding costs. Of course, the maximum width may be predefined to conventional block sizes encountered in 2D video encoding, for instance 16 or 32 pixels.

In embodiments, the 2D image includes a plurality of projection subparts to receive projected faces of the spherical 360-degree image, and the boundary portions of two projection subparts are extended to the same extended block-based boundary portion.

This is for instance the case where the two projection subparts face one the other with an intermediary inactive area (e.g. strip) between them. In that case, the present embodiment searches for the extended block-based boundary that splits the intermediary area into two parts, each one thus extending one of the two projection subparts. This optimizes the use of the inactive area between the two active projection subparts, to reduce seam artefacts.

This approach is well adapted to for instance OHP or ISP or CMP where an inactive area is provided or may be provided between adjacent projection triangles/rectangles/squares having discontinuous edges (i.e. which edges do not correspond to the same pixels in the spherical 360-degree image).

In embodiments, an extending portion of the 2D image defined between the boundary portion and the extended block-based boundary portion is filled in with projected data continuing the projection of the spherical 360-degree image onto the projection subpart. This substantially reduces, nearly suppresses, seam artefacts for the corresponding region.

In specific embodiments, the method further comprises low-pass filtering the extending portion so filled in. This filtering contributes to improve coding efficiency, since the amount of bits to encode the extending region is reduced while keeping good prediction of neighbouring blocks in the active area.

In other embodiments, pixels of a block in an extending portion of the 2D image defined between the boundary portion and the extended block-based boundary portion are set to a constant pixel value equal to a pixel value of the projection subpart within the same block or within an adjacent block. This simplifies the padding operation while keeping good compression performance.

In yet other embodiments, an extending portion of the 2D image defined between the boundary portion and the extended block-based boundary portion is filled in using interpolation (e.g. bilinear filtering) of adjacent pixels, for instance along horizontal or vertical or radial, if any, direction.

In embodiments, the boundary portion is a circular portion surrounding an at least partly circular projection subpart of the 2D image (e.g. obtained from RSP projection technique), for example a circular projection subpart (e.g. obtained from SSP projection technique). The present invention may thus be used to improve RSP-based or SSP-based encoding.

In other embodiments, the boundary portion is made of one or more straight segments forming a boundary of the projection subpart (e.g. one or more edges of a triangle or more obtained from OHP or ISP projection technique or one or more edges of one or more squares/rectangles obtained from CMP projection technique). The present invention may thus be used to improve OH P-based or ISP-based or CMP-based or the like encoding.

In embodiments, pixels of the spherical 360-degree image are made of at least two (usually three) colour components, and different extended block-based boundary portions are generated for the two colour components from the same boundary portion of the projection subpart.

This means for instance that the Luma and Chroma components may be encoded in a different manner, due to different extending/padding portions so built.

For instance, different parameters may be used depending on the colour components selected. As an example, the A parameter above (from which $R_E$ is selected) or $R_E$ itself may be different.

In other embodiments, blocks used to define the extended block-based boundary portion are square or rectangular blocks, the widths of which are selected from 8-pixel width, 16-pixel width, 32-pixel width and 64-pixel width. For instance, the block structure may propose 16-pixel-width blocks, 32-pixel-width blocks or 64-pixel-width blocks, as done by a majority of 2D encoders.

In particular, a rate-distortion approach may be used to locally adapt the extending/padding portion, for better compression efficiency.

Embodiments of the invention also provide a method of decoding a bitstream obtained by the encoding method above, into a spherical 360-degree video in a decoding device, comprising the following steps performed by a microprocessor of the decoding device:

decoding, from the bitstream, a 2D image;
obtaining, from the bitstream, an inactive area parameter;
determining, within the decoded 2D image, locations of two or more projection subparts using the obtained strip width parameter, and
projecting the two or more located projection subparts onto a spherical 360-degree image.

Correspondingly, these embodiments also provide a device for decoding a bitstream obtained by the encoding method above, into a spherical 360-degree video in a decoding device, the device comprising at least one microprocessor configured for carrying out the steps defined above.

In particular, the inactive area parameter may define a width of a strip of pixels between two projection subparts, and the projection format to be used may also be retrieved from the bitstream. Projection formats that may require the parameter to be obtained before being able to exactly locate each face in the 2D image include OHP, ISP and CMP when the encoder includes an inactive area between at least two faces.

In that case the present embodiments make it possible for the decoder to efficiently locate each face in the decoded 2D image, thereby efficiently reconstruct the 360-degree spherical image.

One may note that the decoder takes advantage of the block-based padding defined above at the decoder, without needing to be aware of such padding. This is because the 2D decoding is based on the same block structure as the 2D encoding, thereby automatically performing a decoding on each block as defined and padded by the encoder.

Another aspect of the invention relates to a non-transitory computer-readable medium storing a program which, when executed by a microprocessor or computer system in a device, causes the device to perform any method as defined above.

The non-transitory computer-readable medium may have features and advantages that are analogous to those set out above and below in relation to the method and device.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Further advantages of the present invention will become apparent to those skilled in the art upon examination of the drawings and detailed description. Embodiments of the invention will now be described, by way of example only, and with reference to the following drawings.

DETAILED DESCRIPTION

The invention will now be described by means of specific non-limiting exemplary embodiments and by reference to the figures, which relate to the encoding of spherical 360-degree videos using 2D encoding techniques.

Figure 1:
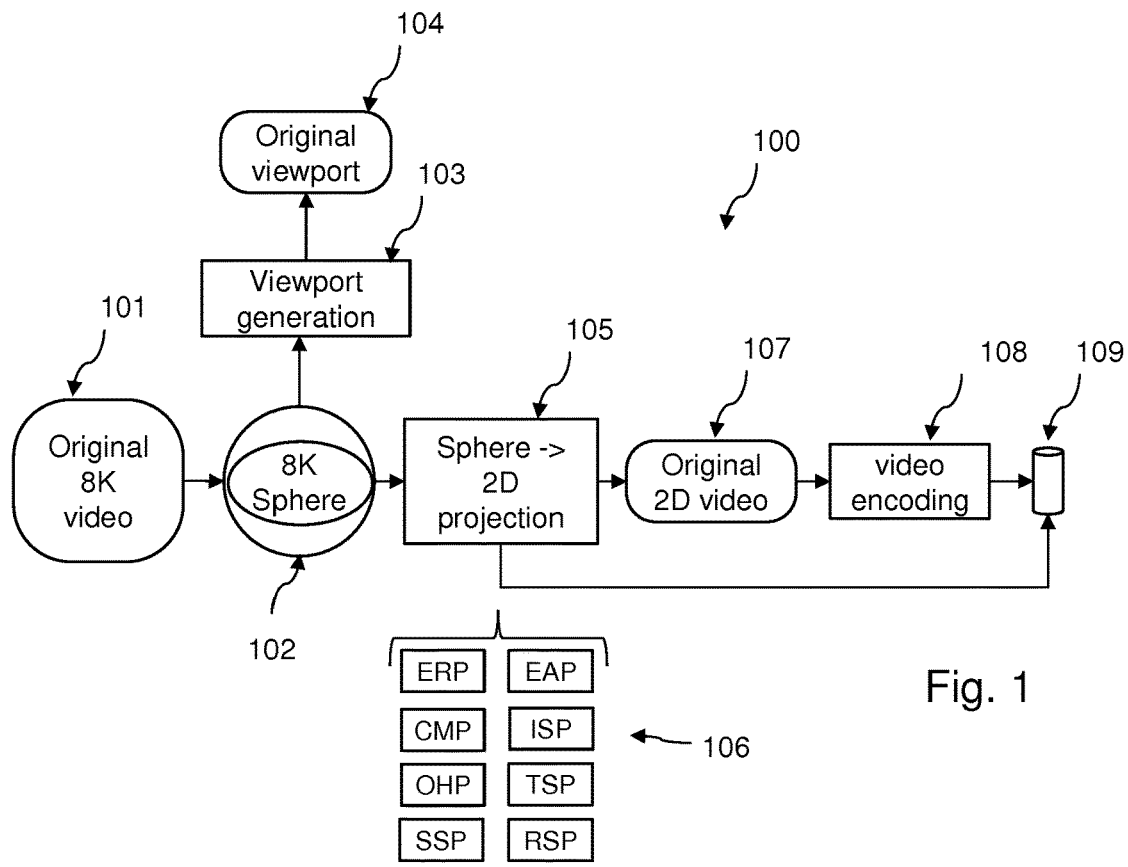
FIG. 1 illustrates a typical 360-degree video encoding system.

FIG. 1 illustrates a typical 360-degree video encoding system 100.

The original 360-degree videos 101 are considered in a sphere representation as schematically shown in 102. In order to have viewports (i.e. 2D rectangles used to project the 360-degree scene from the position of the camera) with a significant resolution, original video sequences of 4K by 2K may be considered as input videos 101.

A viewport can be generated in 103. This step consists in projecting a cap of the spherical 360-degree videos onto a 2D plane. A viewport is usually generated by rectilinear projection. Viewport generation starts from a sample position on the projected viewport, finds the corresponding 3D coordinates, then finds the corresponding 2D coordinates in the source projection plane, and finally takes the corresponding sample value at the corresponding position on the source 2D projection plane.

A viewport typically corresponds to what is seen when focalizing in a particular area of the 360-degree scene for viewing purpose. As this rendering is performed on the original sequence, this viewport is called original viewport 104. It may be used to objectively and/or subjectively compare it with a reconstructed viewport generated in a similar fashion at the decoding side.

For compression purposes, the 8K spherical 360-degree image in 3D format is 2D-projected, i.e. projected onto a 2D image 107 through step 105. Various 3D-sphere-to-2D-plane projections exist, some of which are schematically illustrated through set 106.

Set 106 includes the Equi-Rectangular projection (ERP), the Equi-Area Projection (EAP), the Cube Map projection (CMP), the Icosahedron Projection (ISP), the Truncated Square Pyramid (TSP), the Octahedron Projection (OHP), the Segmented Sphere Projection (SSP) and the Rotated Sphere Projection (RSP). A short presentation of some of them is provided below with reference to FIGS. 4 to 8. Additional details can be found for instance in publication "Algorithm descriptions of projection format conversion and video quality metrics in 360Lib" by Ye Y., Alshina E. and Boyce J. (JVET-F1003, April 2017).

Once the spherical 360-degree image/video has been projected onto the 2D image/video, 2D encoding is applied at step 108 to generate the corresponding video bitstream 109 containing the compressed spherical 360-degree video.

2D encoding scheme can be any video encoder based on standard codecs like H.264 or HEVC/H.265. Various options can be chosen at the encoder to perform the compression: lossless/lossy compression, bit-rate, GOP structure, etc.

Additional information, in particular regarding the 3D-to-2D projection, is added to bitstream 109 as additional metadata (e.g. such as a Supplemental Enhancement Information (SEI) message), in order for the decoder to be able to perform the corresponding inverse projection. The provision of such additional information is illustrated through the arrow between step 105 and final bitstream 109.

In a variant, such additional information may be transmitted to the decoder using another communication channel.

Figure 2:
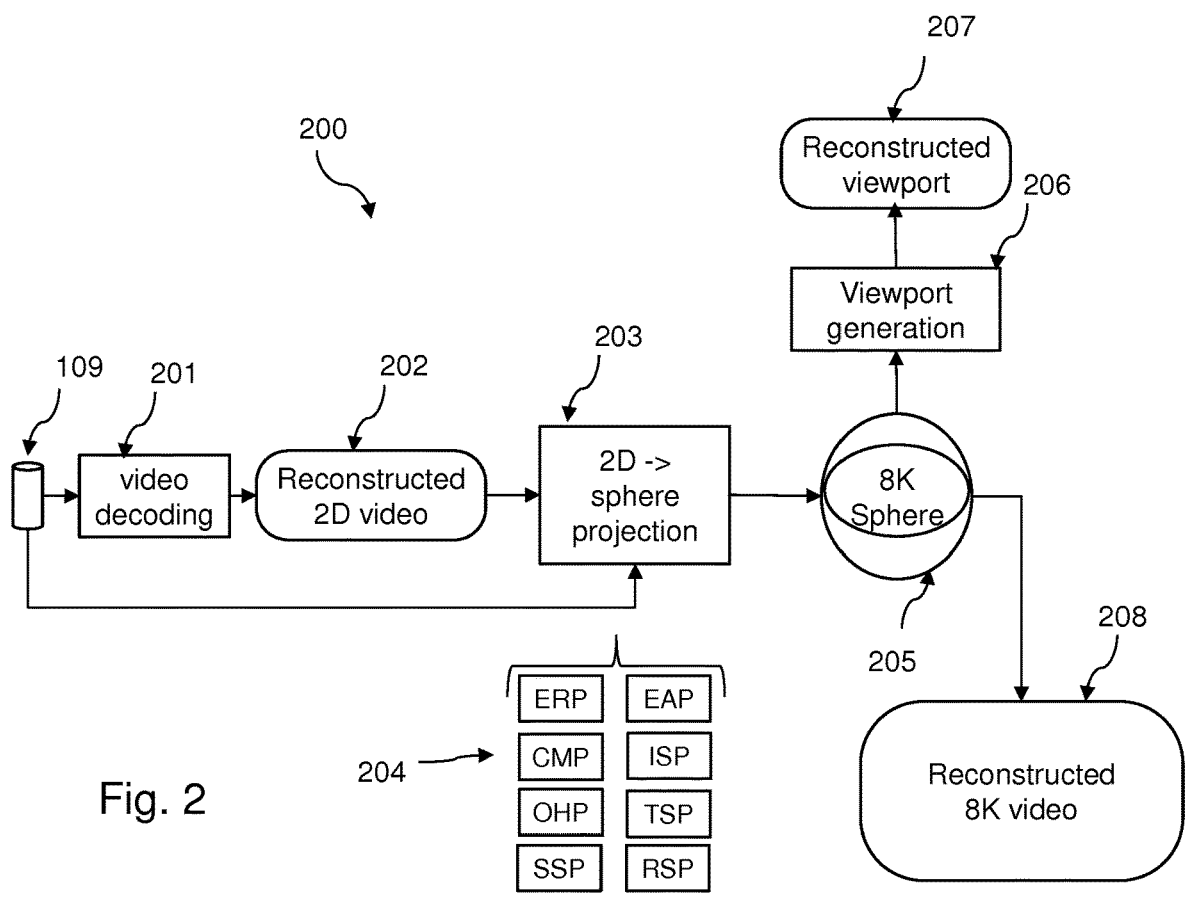
FIG. 2 illustrates a corresponding 360-degree video decoding system.

FIG. 2 illustrates a corresponding 360-degree video decoding system 200, which may thus receive the generated bitstream 109 as input for the decoding.

At step 201, the decoding of bitstream 109 is performed (based for instance on H.264 or HEVC/H.265) to generate a reconstructed 2D video 202. Most of the time, a lossy compression has been performed at the decoder, and some degradations of the video may appear (visible artefacts) especially if the compression is high.

Next, a 2D-to-3D projection, inversed to the 3D-to-2D projection used by the encoder as indicated in the additional information embedded in bitstream 109 (e.g. from SEI message as illustrated through the arrow from bitstream 109 to step 203), is performed at step 203. A reconstructed spherical 360-degree video 205 is thus obtained. Block 208 represents the data representing the reconstructed 360-degree video.

A viewport can be generated in step 206 based on the reconstructed spherical 360-degree video 205, for rendering. It is called reconstructed viewport 207.

Figure 3:
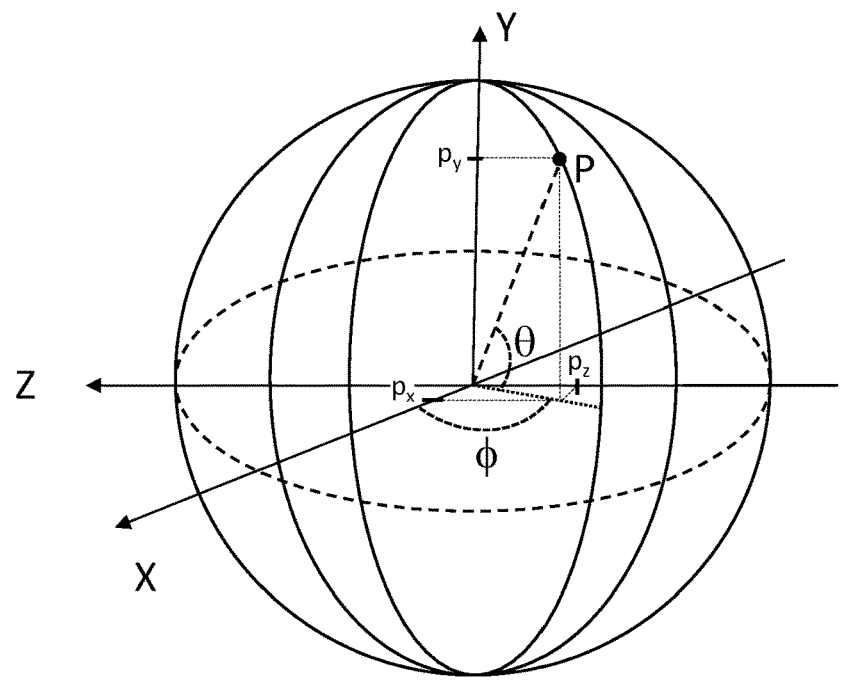
FIG. 3 illustrates a 3D coordinate system (X, Y, Z) to describe 3D geometry for each 3D-to-2D projection format.

Turning now to exemplary 3D-to-2D projections, FIG. 3 illustrates a 3D coordinate system (X, Y, Z) to describe the 3D geometry for each projection format representation.

Starting from the centre of the sphere, X axis points toward the front of the sphere, Y axis points toward the top of the sphere, and Z axis points toward the right of the sphere.

The figure shows the internal (X, Y, Z) coordinate system based on the right-hand coordinate system. The sphere can be sampled with longitude ($\phi$) and latitude ($\theta$). The longitude $\phi$ is in the range $[-\pi,\pi]$, and latitude $\theta$ is in the range $[-\pi/2,\pi/2]$, where $\pi$ is the ratio of a circle's circumference to its diameter.

Longitude $\phi$ is defined by the angle starting from X axis in counter-clockwise direction as shown in the Figure. Latitude $\theta$ is defined by the angle from the equator toward Y axis as shown in the Figure.

Longitude $\phi$ is also called "yaw" in some 3D video application, while latitude $\theta$ is called "pitch".

The $(p_x, p_y, p_z)$ coordinates of point P on the unit sphere can be evaluated from $(\phi, \theta)$ using the following equations:

$$p_x = \cos(\theta)\cos(\phi) \quad\quad\quad\quad (A)$$

$$p_y = \sin(\theta) \quad\quad\quad\quad (B)$$

$$p_z = -\cos(\theta)\sin(\phi) \quad\quad\quad\quad (C)$$

Inversely, the longitude and latitude $(\phi, \theta)$ can be evaluated from $(p_x, p_y, p_z)$ coordinates using the following equations:

$$\phi = \tan^{-1}(-p_z/p_x) \quad\quad\quad\quad (D)$$

$$\theta = \sin^{-1}(p_y/(p_x^2+p_y^2+p_z^2)^{1/2}) \quad\quad\quad\quad (E)$$

A 2D plane coordinate system is defined for each projected face of the spherical 360-degree image in the 2D projection plane. Whereas some of the projection formats have only one face (i.e. the whole image is considered as a single piece to be mapped; e.g. ERP and EAP), other projection formats have multiple faces (which form complementary portions splitting the spherical 360-degree image that have to be projected onto respective projection subparts in the 2D image; e.g. CMP, OHP, ISP, TSP, RSP and SSP).

In order to generalize the 2D coordinate system, a face index (denoted T) is defined for each face in the 2D projection plane. Each face of the spherical image is mapped onto a projection subpart in a 2D plane, referred as the (u, v) plane, associated with one face index. The 2D image sampling grid is defined in the (u, v) plane.

We refer to the sampling point position as (m, n), where m and n are the column and row coordinates of the sampling position in the projection subpart of the 2D image. There is a shift between the origin of (u, v) coordinates and the origin of (m, n) coordinates due to the rounding of the grid.

Finally, in the 3D-to-2D (or 2D-to-3D) projection formulas, W and H respectively designate the width and height of one face of the projection. With these notations and coordinate systems, the 3D-to-2D projection step 105 from the 3D point position ($p_x$, $p_y$, $p_z$) to the sampling point (f, m, n) can be established for each projection format. Correspondingly, the inverse 2D-to-3D projection step 203 from (f, m, n) to ($p_x$, $p_y$, $p_z$) can also be established for each projection format.

FIG. 4 illustrates projection formats using a single projection face. Therefore, the face index f for each of these formats is always set to 0.

Figure 4A:
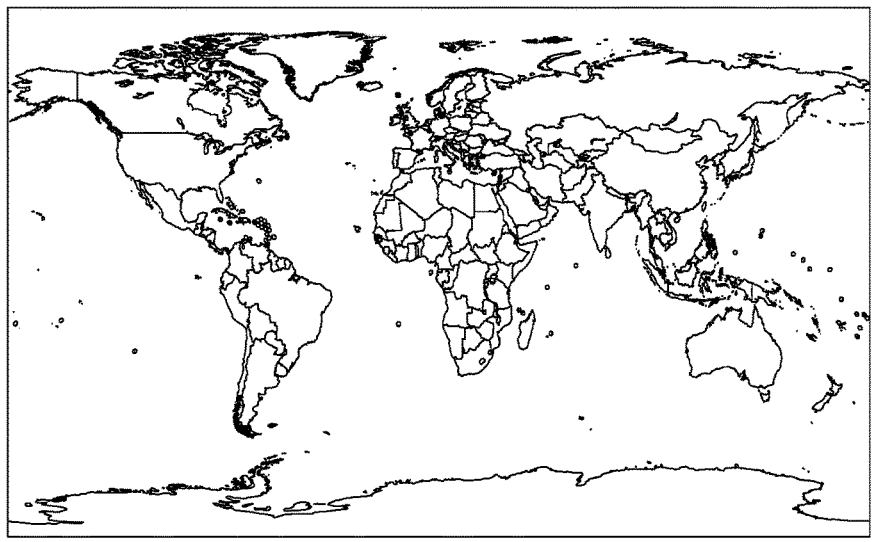
FIG. 4 illustrates projection formats using a single projection face, in particular the Equi-Rectangular Projection format (FIG. 4a) and the Equal Area Projection format (FIG. 4b)

FIG. 4a illustrates the ERP format (Equi-Rectangular Projection). The Figure shows the ERP of the Earth globe.

The ERP projection format is the most widely used projection format for representing 360-degree videos on a 2D plane. In the (u, v) plane, u and v are in the range [0, 1].

The 2D-to-3D inverse projection starts from a given sampling position (m, n), and calculates (u, v) using the following rounding steps:

$$u=(m+0.5)/W,\ 0\le m<W \quad\quad (F)$$

$$v=(n+0.5)/H,\ 0\le n<H \quad\quad (G)$$

Next, the longitude and latitude ($\phi$, $\theta$) in the sphere can be calculated from (u, v) by using the following formula:

$$\phi=(u-0.5)*(2*\pi) \quad\quad (H)$$

$$\theta=(0.5-v)*\pi \quad\quad (I)$$

Finally 3D coordinates ($p_x$, $p_y$, $p_z$) can be calculated using formulas (A), (B) and (C) above.

The 3D-to-2D coordinate conversion (projection) starts from ($p_x$, $p_y$, $p_z$), calculates ($\phi$, $\theta$) using (D) and (E), and then calculates (u, v) by solving equations (H) and (I). Finally (m, n) is calculated by solving equations (F) and (G).

Figure 4B:
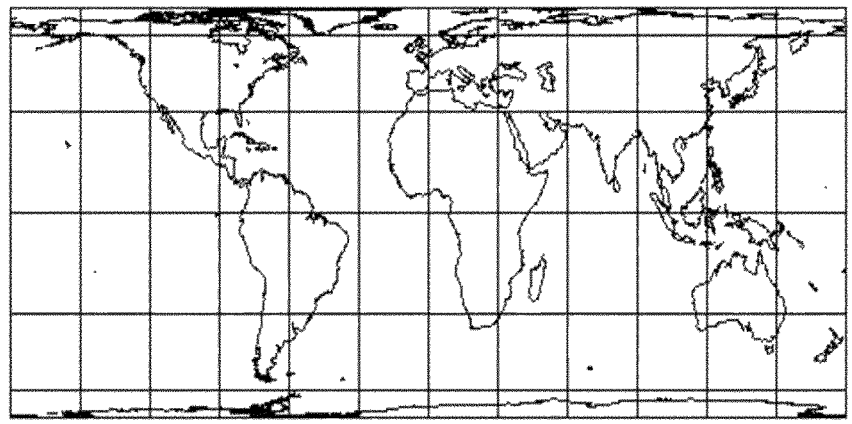

FIG. 4b illustrates the EAP format (Equal Area Projection). The Figure shows a cylindrical EAP of the Earth globe, which is quite similar (visually) to the ERP.

As for the ERP format, f=0 and in the (u, v) plane, u and v are in the range [0, 1].

The 2D-to-3D inverse projection starts from a given sampling position (m, n), and calculates (u, v) using the following rounding steps:

$$u=(m+0.5)/W,\ 0\le m<m \quad\quad (J)$$

$$v=(n+0.5)/H,\ 0\le n<H \quad\quad (K)$$

Next, the longitude and latitude ($\phi$, $\theta$) on the sphere can be calculated from (u, v) as:

$$\phi=(u-0.5)*(2*\pi) \quad\quad (L)$$

$$\theta=\sin^{-1}(1.0-2*v) \quad\quad (M)$$

Finally 3D coordinates ($p_x$, $p_y$, $p_z$) can be calculated using formulas (A), (B) and (C) above.

The 3D-to-2D projection starts from ($p_x$, $p_y$, $p_z$), calculates ($\phi$, $\theta$) using (D) and (E), and then calculates (u, v) by solving equations (L) and (M). Finally (m, n) is calculated by solving equations (J) and (K).

Figure 5:
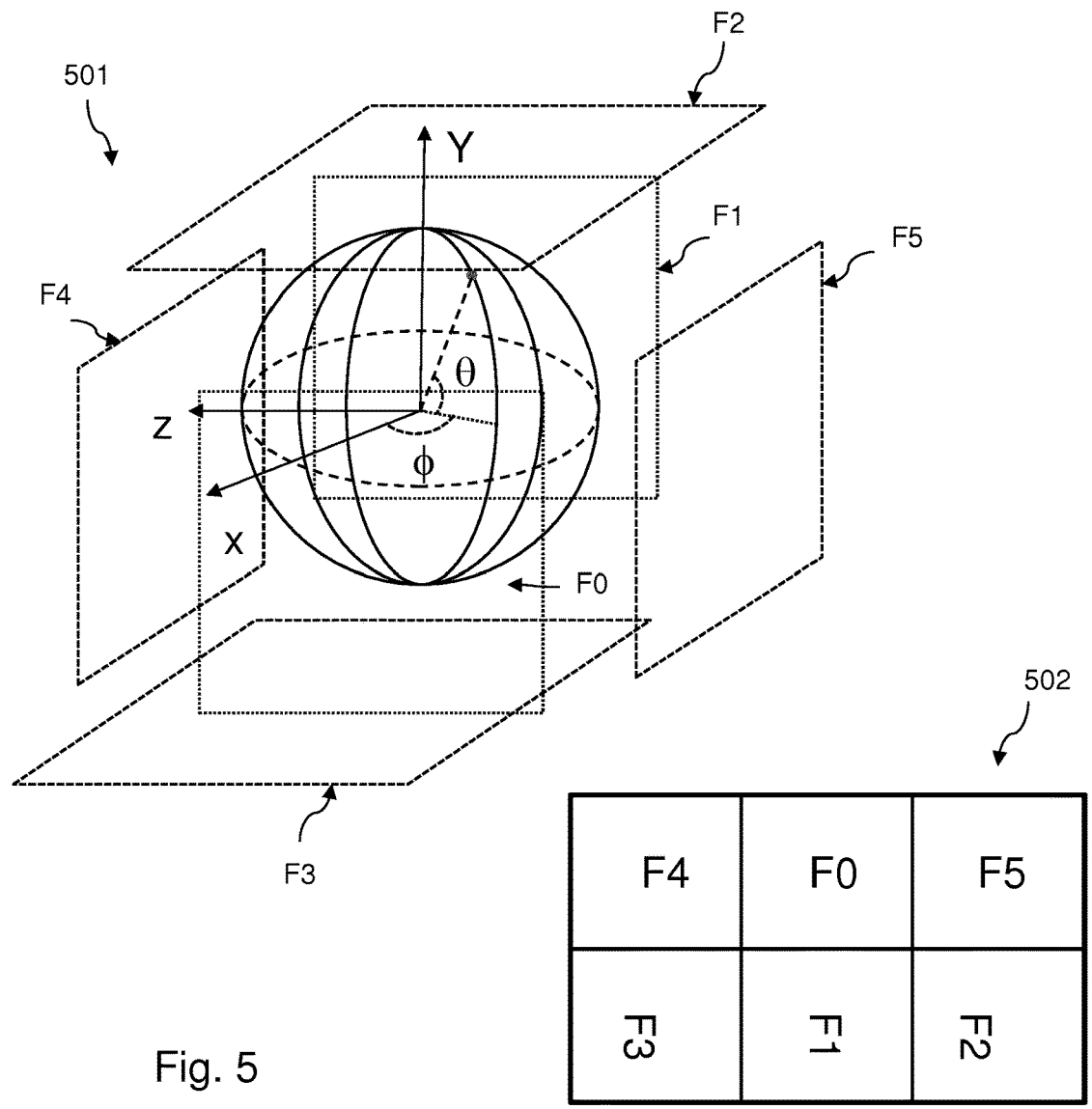
FIG. 5 illustrates the Cubic Map Projection format which projects the spherical image onto six faces of a cube.
Figure 5:
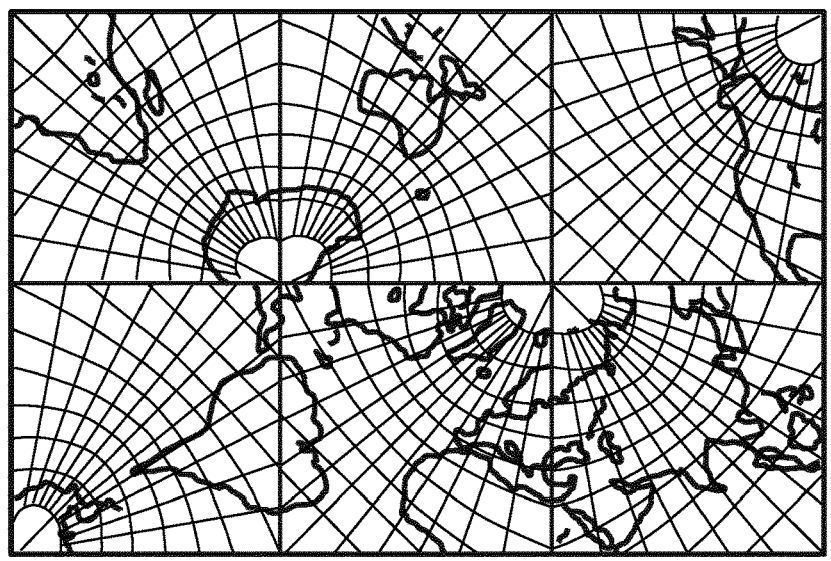

FIG. 5 illustrates the CMP (Cubic Map Projection) format which projects the spherical image onto six faces F0-F5 of a cube. The six faces are arranged into a rectangular frame (2D image) in order to minimize the non-continuous frontiers, i.e. to minimize discontinuity between neighbouring faces so as not to impact coding efficiency.

502 specifies, using the face index values, a CMP 3×2 exemplary arrangement of the projection subparts of the 2D image corresponding to each of the six CMP faces. In this exemplary arrangement, F4, F0 and F5 form the first row, while faces F3, F1 and F2 of the bottom row are rotated by 90 degrees.

The bottom of the Figure illustrates a CMP projection of the Earth globe seen from its centre.

Each face in the (u, v) plane is a 2×2 square, with u and v being defined in the range of [−1, 1]. The dimensions of any square face F are defined by H×H.

For the 2D-to-3D inverse projection, given the position (m, n) on a given face F, the coordinates (u, v) are calculated as follows:

$$u=((m+0.5)*2/H)-1,\ 0\le m<H$$

$$v=((n+0.5)*2/H)-1,\ 0\le n<H$$

Next, the 3D coordinates ($p_x$, $p_y$, $p_z$) are derived using the following relations:

| Face F | $p_x$ | $p_y$ | $p_z$ |
|---|---|---|---|
| F0 | 1.0 | −v | −u |
| F1 | −1.0 | −v | u |
| F2 | u | 1.0 | v |
| F3 | u | −1.0 | −v |
| F4 | u | −v | 1.0 |
| F5 | −u | −v | −1.0 |

For the 3D-to-2D projection, given ($p_x$, $p_y$, $p_z$), the (u, v) and face index F are calculated as follows:

| Condition | Face F | u | v |
|---|---|---|---|
| $\|p_x\| \ge \|p_y\|$ and $\|p_x\| \ge \|p_z\|$ and $p_x > 0$ | F0 | $-p_z/\|p_x\|$ | $-p_y/\|p_x\|$ |
| $\|p_x\| \ge \|p_y\|$ and $\|p_x\| \ge \|p_z\|$ and $p_x < 0$ | F1 | $p_z/\|p_x\|$ | $-p_y/\|p_x\|$ |
| $\|p_y\| \ge \|p_x\|$ and $\|py\| \ge \|p_z\|$ and $p_y > 0$ | F2 | $p_x/\|p_y\|$ | $p_z/\|p_y\|$ |
| $\|p_y\| \ge \|p_x\|$ and $\|p_y\| \ge \|p_z\|$ and $p_y < 0$ | F3 | $p_x/\|p_y\|$ | $-p_z/\|p_y\|$ |
| $\|p_z\| \ge \|p_x\|$ and $\|p_z\| \ge \|p_x\|$ and $p_z > 0$ | F4 | $p_x/\|p_z\|$ | $-p_y/\|p_z\|$ |
| $\|p_z\| \ge \|p_x\|$ and $\|p_z\| \ge \|p_y\|$ and $p_z < 0$ | F5 | $-p_x/\|p_z\|$ | $-p_y/\|p_z\|$ |

Although FIG. 5 illustrates an exemplary arrangement of the six faces in the 2D images, other arrangements may exist. More generally, the projection formats that have multiple faces may usually provide various face arrangements in the 2D image.

The face arrangement scheme and rotation parameters can be provided in the bitstream or in a SEI message associated with the bitstream to allow the user to specify whether to rotate or not a given face by 0, 90, 180 or 270 degrees, and where to place that given face in the 2D image.

Figure 6:
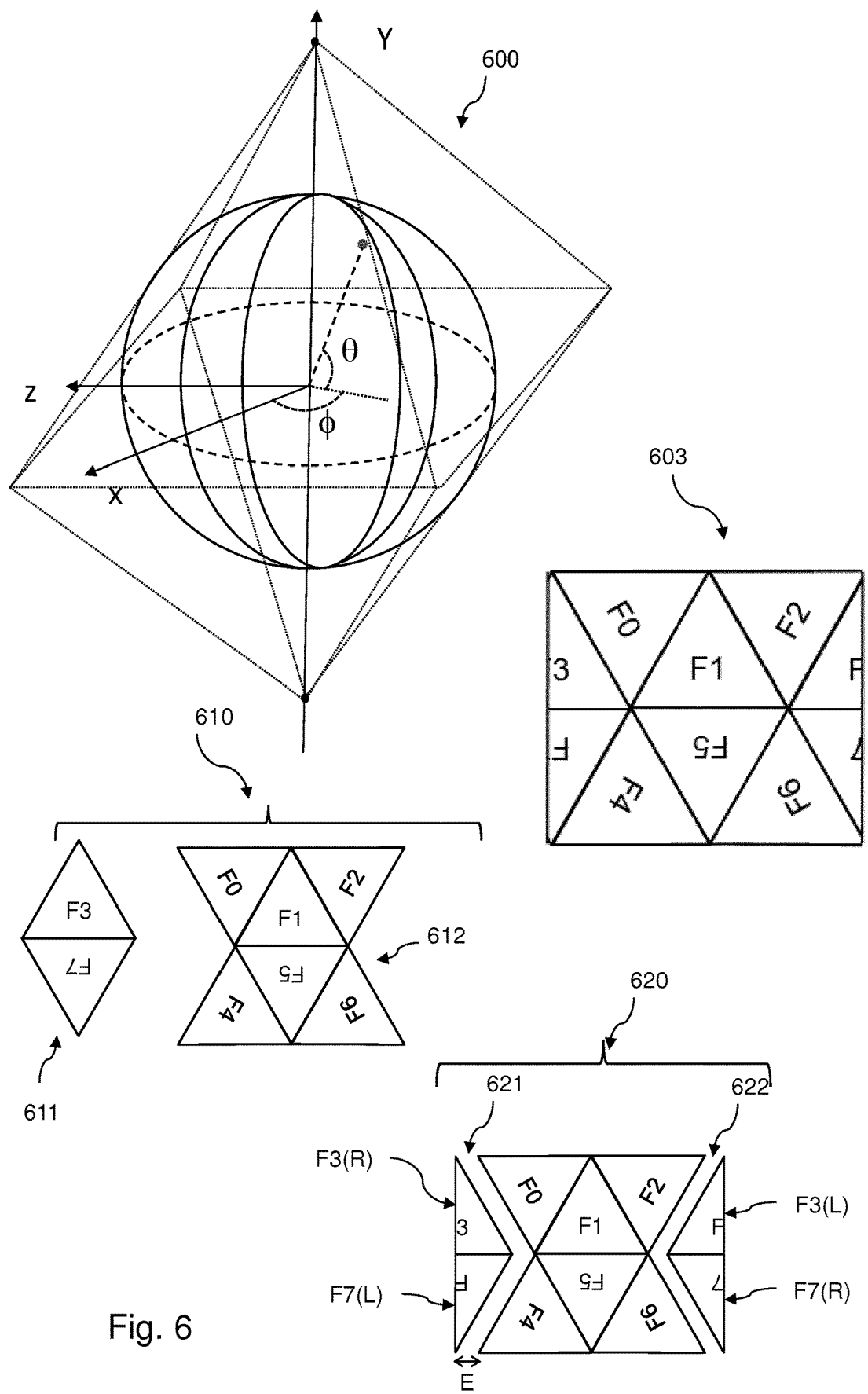
FIG. 6 illustrates the OctaHedron Projection (OHP) format which projects the spherical image onto height triangles connected by six vertices.

FIG. 6 illustrates the OHP (OctaHedron Projection) format which projects the spherical image onto height triangles connected by six vertices as represented by 600.

The triangle faces need to be arranged carefully into the 2D image in order to minimize discontinuity between neighbouring faces so as not to impact coding efficiency. An exemplary arrangement is shown in 603 where all the triangles are side by side to avoid inactive pixels in the 2D image, and thus to have better coding efficiency.

Other arrangements providing inactive pixels (i.e. without corresponding projected sample position from the spherical image), for instance between discontinuous edges of the triangles, may be contemplated. This is to avoid image degradation (seam) at these edge discontinuities, due to compression. An example of such arrangement is provided under reference 620 as discussed below.

The inactive pixels are usually filled with default grey colour.

The eight triangle faces (F0, ... , F7) are arranged in the 2D image to have a maximum number of continuous edges. Two distinct sets 611 and 612 of triangles with continuous edges can be formed as shown under reference 610. Keeping the continuity between triangle edges reduces visual artefacts (seam) in the rendered image (after compression).

The two distinct sets 611 and 612 are next arranged into a rectangular image as shown in 620 (or 603). To do so, triangles F3 and F7 are split into two equal triangles which are then arranged on the right and left sides of set 612. Furthermore, intermediary inactive areas (made of inactive pixels) may be provided between discontinuous edges for the arrangement 620. In the present example, such intermediary inactive areas are represented by spaces or strips 621 and 622, having an horizontal width E (which may be adjusted and indicated to the decoder).

Techniques are known that provides padding pixels for these intermediary spaces to smooth these discontinuous edges. For instance, a band of 16 horizontal (or vertical) padding pixels between the discontinuous edges can be provided in intermediary spaces 621 and 622, where the padding pixels are generated by using a distance-based linear filter. To do so, the horizontal (or vertical) filtering process uses neighbouring pixels belonging to two different faces to generate the values for the padding pixels. In such a case, the width (or height) of the 2D image to be compressed is extended by 16 pixels compared to a case where no padding area is added.

ISP (Icosahedron projection) format is more complex than OHP and is described in above-mentioned publication "Algorithm descriptions of projection format conversion and video quality metrics in 360Lib" by Ye Y., Alshina E. and Boyce J. (JVET-F1003, April 2017).

Figure 7:
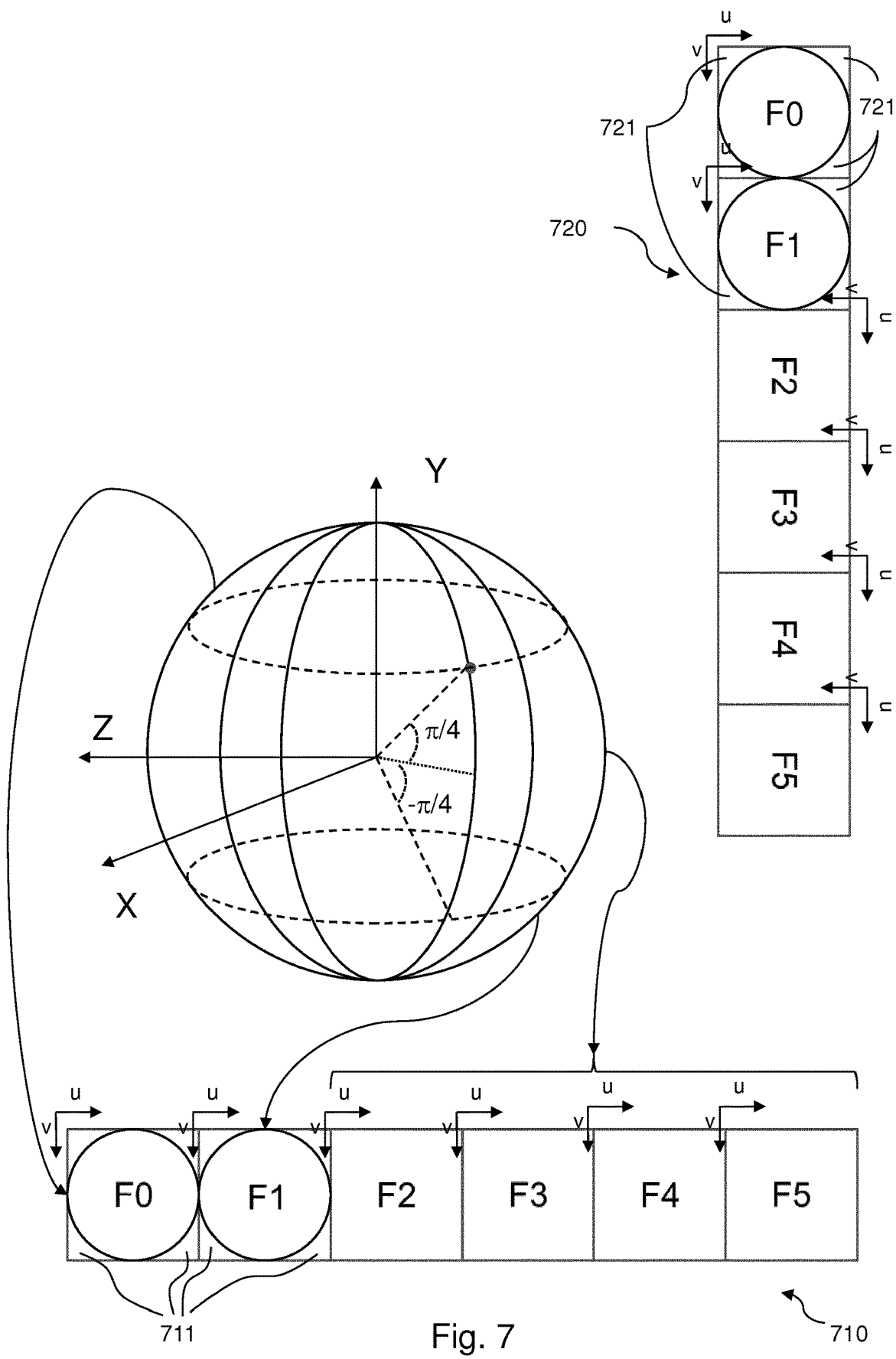
FIG. 7 illustrates the Segmented Sphere Projection (SSP) format which splits the sphere into three segments for 3D-to-2D projection purposes: the north pole, the equator, and the south pole.

FIG. 7 illustrates the SSP (Segmented Sphere Projection) format which splits the sphere into three segments: the north pole, the equator, and the south pole.

The boundaries of the three segments are defined at latitude 45° N ($\pi/4$) and 45° S ($-\pi/4$).

The north and south poles are mapped (or projected) onto two circles, namely faces "F0" and "F1", forming two projection subparts of the 2D image. The equatorial segment comprised between ($-\pi/4$) and ($\pi/4$) uses the same projection as ERP: the equatorial segment is split into four squares or pieces in order to get "faces" F2-F5 of the same size to be projected onto four corresponding subparts of the 2D image. The diameter of the circles is equal to the face edge size (H below) of the equatorial segments because they all have a $\phi/2$ latitude span.

710 and 720 show two exemplary SSP arrangements for faces F0-F5, with their definition of (u, v) coordinates. Again the arrangement used (including the rotations of the faces) may be signalled in bitstream 109 or in another communication channel.

As shown in these two exemplary arrangements, the corners 711/721 of the two pole segments form inactive areas (with inactive pixels) because they do not correspond to projected pixels from the spherical image. As inactive pixels, they are filled with a default grey colour.

The 2D-to-3D projection starts from a point (m,n) on a face F, maps it on a point on the sphere ($\phi$, $\theta$) according to the following relations.

For face F=0 (north pole), the longitude and the latitude of the corresponding 3D point are computed as follows:

$$\phi = \arctan\left(m + 0.5 - \frac{H}{2}, n + 0.5 - \frac{H}{2}\right)$$

-continued $$\theta = \frac{\pi}{2}\left(1 - \frac{r}{H}\right)$$

where $$r = \sqrt{\left(m + 0.5 - \frac{H}{2}\right)^2 + \left(n + 0.5 - \frac{H}{2}\right)^2},$$

and arctan(x,y) calculates the inverse tangent of y/x.

For face F=1, the longitude and the latitude of the corresponding 3D point are computed as follows:

$$\phi = \arctan\left(m + 0.5 - \frac{H}{2}, \frac{H}{2} - n - 0.5\right)$$

$$\theta = \frac{\pi}{2}\left(\frac{r}{H} - 1\right)$$

For the square faces F2-F5 (with face index f=2 ... 5), the longitude and the latitude of the corresponding 3D point are computed as follows:

$$\phi = \left(\frac{m + 0.5}{H} + f - 2\right) \cdot \frac{\pi}{2}$$

$$\theta = \frac{\pi}{4} - \frac{n + 0.5}{H} \cdot \frac{\pi}{2}$$

The 3D-to-2D projection starts from a point ($\phi$, $\theta$) on the sphere and maps it to a point (m,n) on a face F according to the following equations.

For $\theta \in [\pi/4; \pi/2]$ and $\phi \in [-\pi; \pi]$, face F is F0 (north pole), and the following applies to obtain coordinates (m,n):

$$m = \frac{H}{2}\left(1 + \frac{\left(\frac{\pi}{2} - \theta\right)\sin\phi}{\frac{\pi}{4}}\right) - 0.5$$

$$n = \frac{H}{2}\left(1 + \frac{\left(\frac{\pi}{2} - \theta\right)\cos\phi}{\frac{\pi}{4}}\right) - 0.5$$

For $\theta \in [\pi/2; \pi/4]$ and $\phi \in [-\pi; \pi]$, face F is F1 (south pole); and the following applies:

$$m = \frac{H}{2}\left(1 + \frac{\left(\frac{\pi}{2} + \theta\right)\sin\phi}{\frac{\pi}{4}}\right) - 0.5$$

$$n = \frac{H}{2}\left(1 - \frac{\left(\frac{\pi}{2} + \theta\right)\cos\phi}{\frac{\pi}{4}}\right) - 0.5$$

For the square faces ($\theta \in [-\pi/4; \pi/4]$), face F (of index f) is determined based on $\phi$ by finding f (between 2 and 5) satisfying $$\phi \in \left[-\pi + (f-2)\frac{\pi}{2}, -\frac{\pi}{2} + (f-2)\frac{\pi}{2}\right].$$

Next, the following applies:

$$m = \frac{2\phi}{\pi}H + (4-f)H - 0.5$$

$$n = \frac{H}{2} - \frac{2\theta}{\pi}H - 0.5$$

Figure 8:
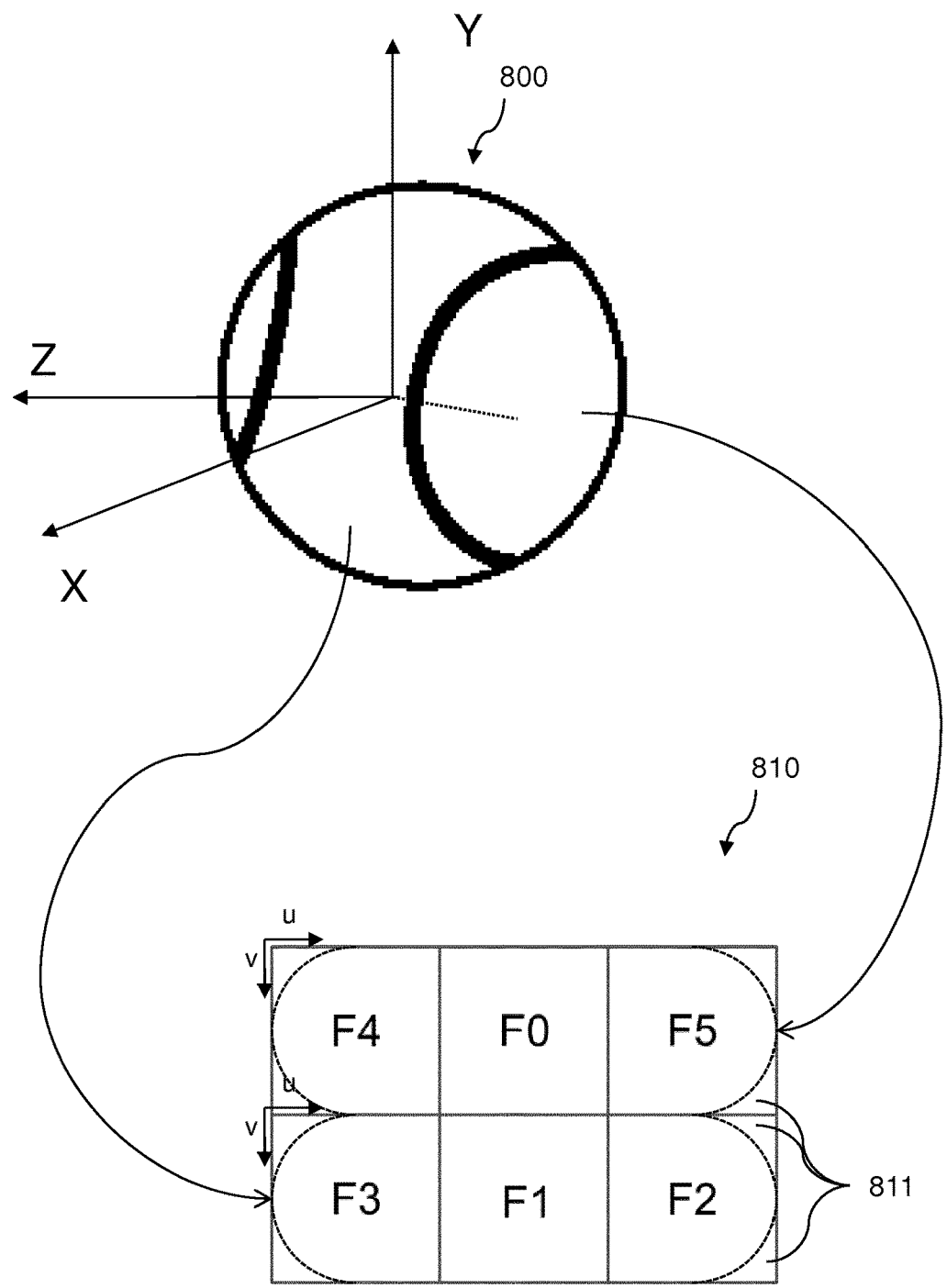
FIG. 8 illustrates the Rotated Sphere Projection format which splits the sphere into two segments of equal size for 3D-to-2D projection purposes.

FIG. 8 illustrates the RSP (Rotated Sphere Projection) format which splits the sphere into two segments of equal size (which look similar to the two patches forming a tennis ball as delimited by bold line of the ball 800). Each segment is projected onto a 2D projection subpart of the 2D image as shown in 810 (each row corresponds to one of the two segments).

Since RSP has a 3:2 aspect ratio like the cube map projection (CMP), the RSP format is implemented by using six faces as shown under reference 810 in the Figure, the end faces F2-F5 of each row being outwardly curved. At the end, the spherical 360-degree image is split into six complementary pieces, each of them being mapped onto a corresponding projection subpart (face F) splitting the 2D image.

As shown in the Figure, the corners 811 between the 2D image boundary and the curved line of the end faces F2-F5 form inactive areas (with inactive pixels) because they do not correspond to projected pixels from the spherical image. As inactive pixels, they are filled with a default grey colour.

The 2D-to-3D projection starts from a point (m,n) on a face F, maps it on a point on the sphere ($\phi$, $\theta$) according to the following process.

With reference to FIG. 8, the dimension of each RSP segment (i.e. row in the 2D image) is defined as being W×H.

Normalized (u, v) coordinates of faces F4, F0, F5 of the top row can be derived from (m, n) as follows:

$$u = \left(\frac{m+0.5}{W}\right)$$

$$v = \left(\frac{n+0.5}{H}\right)$$

For faces F3, F1, and F2, the following rotation is first performed on the sphere during 2D-to-3D and 3D-to-2D conversions:
   180° rotation along Y-axis (to bring back side to the front)
   90° rotation along X-axis (to bring polar area to the equator).

Let ($p_x'$, $p_y'$, $p_z'$) be the 3D coordinates on the sphere after performing the above rotation to the 3D point ($p_x$, $p_y$, $p_z$):

$$p_x' = -p_x; p_y' = -p_z; p_z' = -p_y$$

Next, the latitude and longitude ($\phi$, $\theta$) of a 3D point on the sphere for faces F4, F0 and F5 can be derived from a 2D point as follows:

$$\phi = \frac{3\pi}{2}(u - 0.5)$$

-continued $$\theta = \frac{\pi}{2}(0.5 - v)$$

Normalized (u, v) coordinates of faces F3, F1, F2 of the bottom row can be derived from (m, n) using the formulas above supplemented by the following final formula giving the latitude and longitude ($\phi$, $\theta'$) of a 3D point on the sphere:

$$\theta' = \sin^{-1}(\cos\theta \sin\phi)$$

$$\phi' = \tan^{-1}\frac{\tan\theta}{-\cos\phi}$$

The 3D-to-2D projection starts from a point ($\phi$, $\theta$) on the sphere and maps it to a point (m,n) on a face F according to the following equations.

Regarding a point (m,n) of the top row in the 2D image, it can be expressed as follows:

$$m = W\left(\frac{2\phi}{3\pi} + 0.5\right) - 0.5$$

$$n = H\left(-\frac{2\theta}{\pi} + 0.5\right) - 0.5$$

From a given a 3D point ($p_x$, $p_y$, $p_z$) on the sphere, face index F of RSP is determined in two steps.

First, given ($p_x$, $p_y$, $p_z$), an intermediate face index $F_{int}$ is determined in the same way as the CMP 3D-to-2D projection (see corresponding table above).

Next, if the intermediate face index $F_{int}$ is F0 or F1, the final face index F is set equal to $F_{int}$.

Otherwise, if the intermediate face index $F_{int}$ is F2, F3, F4 or F5, the final face index F is set as defined below, depending of fulfilling some conditions:

| $F_{int}$ | Condition | Final face index: F |
|---|---|---|
| $F_{int}$ = 2 or 3 | $p_x > 0$ and $\|(p_x, p_y, p_z) - Q\| > T$, where $Q = (0, 1, 0)$ if $F_{int} = 2$ $Q = (0, -1, 0)$ if $F_{int} = 3$ | $F = 0$ if $-\frac{\pi}{4} < \phi < \frac{\pi}{4}$ $F = 4$ if $\phi < -\frac{\pi}{4}$ $F = 5$ if $\frac{\pi}{4} < \phi$ |
| $F_{int}$ = 4 or 5 | $p_x < 0$ and $\|(p_x, p_y, p_z) - Q\| > T$, where $Q = (0, 1, 0)$ if $F_{int} = 4$ $Q = (0, 0, -1)$ if $F_{int} = 5$ | $F = 1$ if $\theta < 0$ and $\phi \geq -\frac{\pi}{4}$ or $\theta > 0$ and $\phi \leq \frac{\pi}{4}$ $F = 2$ if $\theta > 0$ and $\phi > \frac{\pi}{4}$ $F = 3$ if $\theta < 0$ and $\phi < -\frac{\pi}{4}$ |

When the conditions in the centre column of this table are true, the final face index is computed according to the right column. Otherwise, F is set equal to $F_{int}$ directly.

This computation is needed because a point on face F2, F3, F4, or F5 may end up in an inactive region.

Expression $\|(p_x, p_y, p_z) - Q\|$ computes the squared distance between a given point P of coordinate $p_x$, $p_y$ and $p_z$ and the reference point Q of coordinate $q_x$, $q_y$, $q_z$ (as defined in the table above). This distance is for instance equal to $(p_x - q_x)^2 + (p_y - q_y)^2 + (p_z - q_z)^2$.

Variable T is used to slightly extend the projection in the inactive area to create padding pixels to help reconstruction and reduce seam artefacts. A determination of value T is similar to extend the circle to a further radius R to add some pixels.

Generally, T takes the value of 0.6005. With this value, the arcs or curved forming boundaries with the inactive area are extended by a reasonable number of samples.

As introduced above, some of the projection formats split the spherical 360-degree image into complementary pieces which are mapped onto respective projection subparts (faces) splitting the 2D image. This may lead to have inactive areas in the 2D image where the projection does not fill the whole 2D image (see corners in SSP and RSP formats due to curved faces). Also, inactive areas may be introduced between discontinuous faces to reduce seam artefacts (see OHP and ISP formats, which may be extended to any projection format with discontinuous faces in the 2D image).

Padding of these inactive areas has already been proposed before encoding the 2D image by an encoder. The padding mainly consists in extending, within the 2D image, a boundary portion of the projection subpart (i.e. face) into an extended boundary portion.

For instance, JVET contribution referenced JVET-F0052 provides targeted padding in an inactive area of an EAP-based segmented sphere projection. It mainly provides padding surrounding the north and south pole faces. In that example, the boundary portions that are extended are circles corresponding to the boundaries of the pole faces.

The inventors have for instance noticed that a common radial extension for the padding pixels, where no particular attention is paid in the way of extending, provides worse objective results that the original SSP projection with no padding.

The present invention seeks to provide a better balance between seam artefact reduction and video coding efficiency. It takes advantage of properties of the video encoder, which is most often a block-based encoder using a block structure, to accordingly adjust the boundary portion extension. In particular, the present invention proposes to extend the boundary portion of the projection subpart into an extended block-based boundary portion based on the block structure used by the encoder.

For illustrative purposes, an HEVC encoder may divide an image to encode into coding units (which are then divided for each luma/chroma component into coding tree blocks). The HEVC encoder has the choice of using coding units of 64×64, 32×32, 16×16 or 8×8 blocks block sizes. The resulting blocks are encoded usually using prediction. Other video or image encoders provide other available coding unit sizes.

Coding efficiency will be improved if each coding unit is the most homogeneous.

The proposed boundary portion extension thus seeks to provide more homogenous coding units in the inactive areas. This is achieved by performing the boundary portion extension block by block according to the block structure on which the encoder will base its encoding. In other words, the extended block-based boundary portion may match a block grid used by the block-based encoder.

In seeking to have homogenous blocks (or coding units) in the inactive areas while keeping low seam artefacts, various approaches may be used to set pixel values of padding pixels extending the initial boundary portion.

In one embodiment, an extending portion of the 2D image defined between the boundary portion and the extended block-based boundary portion is filled in with projected data continuing the projection of the spherical 360-degree image onto the projection subpart. It means the 3D-to-2D projection is continued in the extending portion. It suppresses any sharp discontinuity at the initial boundary portion.

This approach substantially reduces, nearly suppresses, seam artefacts for the corresponding region, because the decoder reconstructs the 360-degree video along the initial boundary portions.

One may note that this embodiment results in having some 3D points being projected twice in the 2D image: once in the corresponding projection subpart, once as a padding pixel extending another projection subpart. This additional information (padding pixels) unexpectedly does not degrade video compression. On the contrary, it improves it.

In fact, as blocks are thus formed in the inactive area with padding pixels having similar content to neighbouring pixels from the active area, better compression of the blocks overlapping the inactive and active areas is obtained.

An enhanced embodiment may comprise low-pass filtering the extending portion so filled in. It may be applied to any padding pixels or to padding pixels belonging to coding units not overlapping the initial projection subpart (i.e. pixels that form newly created blocks—additional to the projection subpart to be extended).

Despite the degradation of the content, this filtering reduces the amount of bits to encode the extending portion, while still being a good predictor for neighbouring blocks of the active area.

In a variant to continuing the 3D-to-2D projection, padding pixels of a block in an extending portion of the 2D image defined between the boundary portion and the extended block-based boundary portion are set to a constant pixel value equal to a pixel value of the projection subpart within the same block (if the padding pixels supplement a block partially filled by the active area—initial projection subpart) or within an adjacent block. This simplifies the padding operation while keeping good compression performance.

In another variant, an extending portion of the 2D image defined between the boundary portion and the extended block-based boundary portion is filled in using interpolation of adjacent pixels, for instance along horizontal or vertical or radial, if any, direction.

The interpolated values (for padding pixels) may be created by applying a bilinear filter. The interpolation filter can be linear and based on pixels values of the active area and a default pixel value that may be grey value. This provides some information from the active area in the inactive area next to the active area, thus reducing the seam artefacts and improving compression of the blocks overlapping these two areas.

The interpolation filter could be applied along the horizontal or vertical directions, or even along a radial direction to be aligned with the content orientation of active area (see for instance the radial direction in SSP or RSP formats).

Figure 9A:
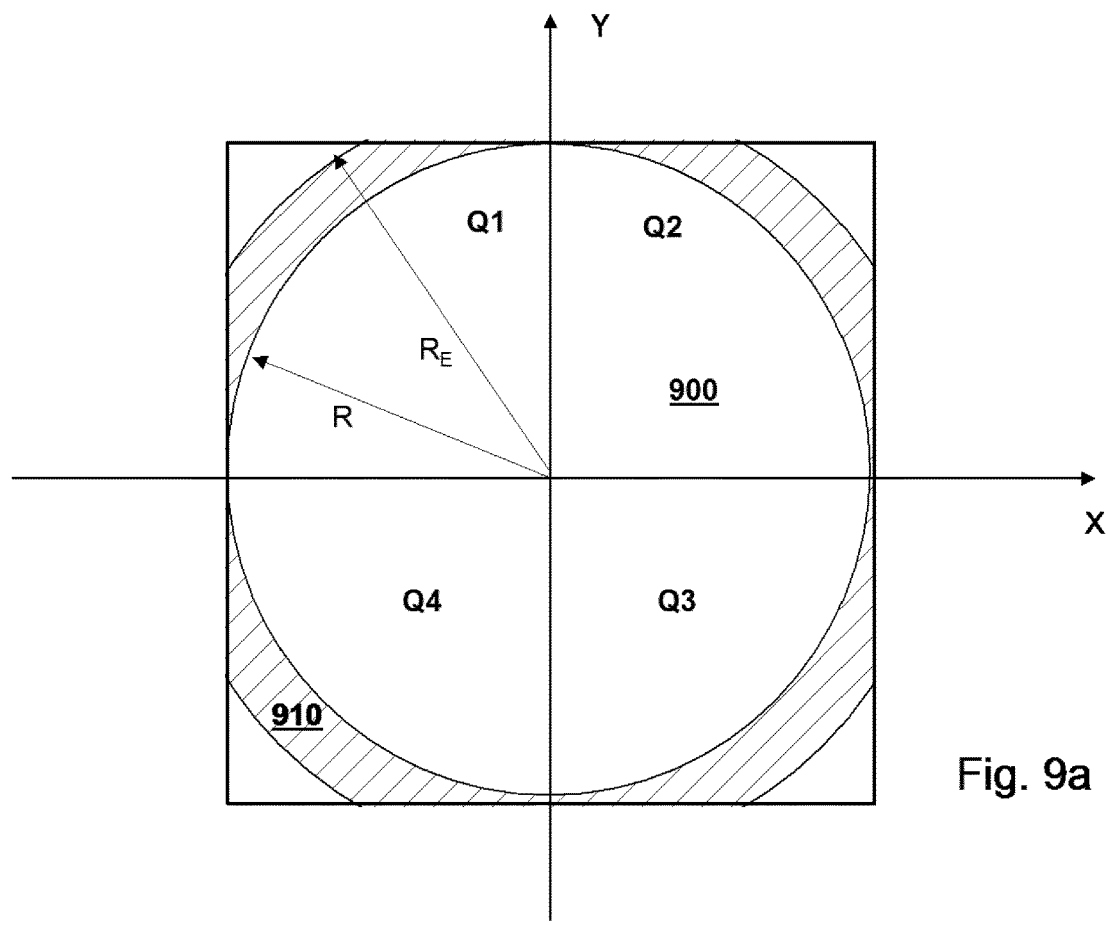
FIG. 9 illustrates a boundary portion extension of a SSP-based pole projection according to embodiments of the present invention.

Turning now to the building of the extended block-based boundary portion, reference is made to FIG. 9. The process as described now extends, within the 2D image, a boundary portion of the projection subpart into an extended block-based boundary portion based on a block structure.

The boundary portion to extend may be a circular portion surrounding an at least partly circular projection subpart of the 2D image, e.g. the half-circle obtained from RSP projection technique or the circle obtained from SSP projection technique). FIG. 9 shows the case of the circle in SSP.

Figure 10:
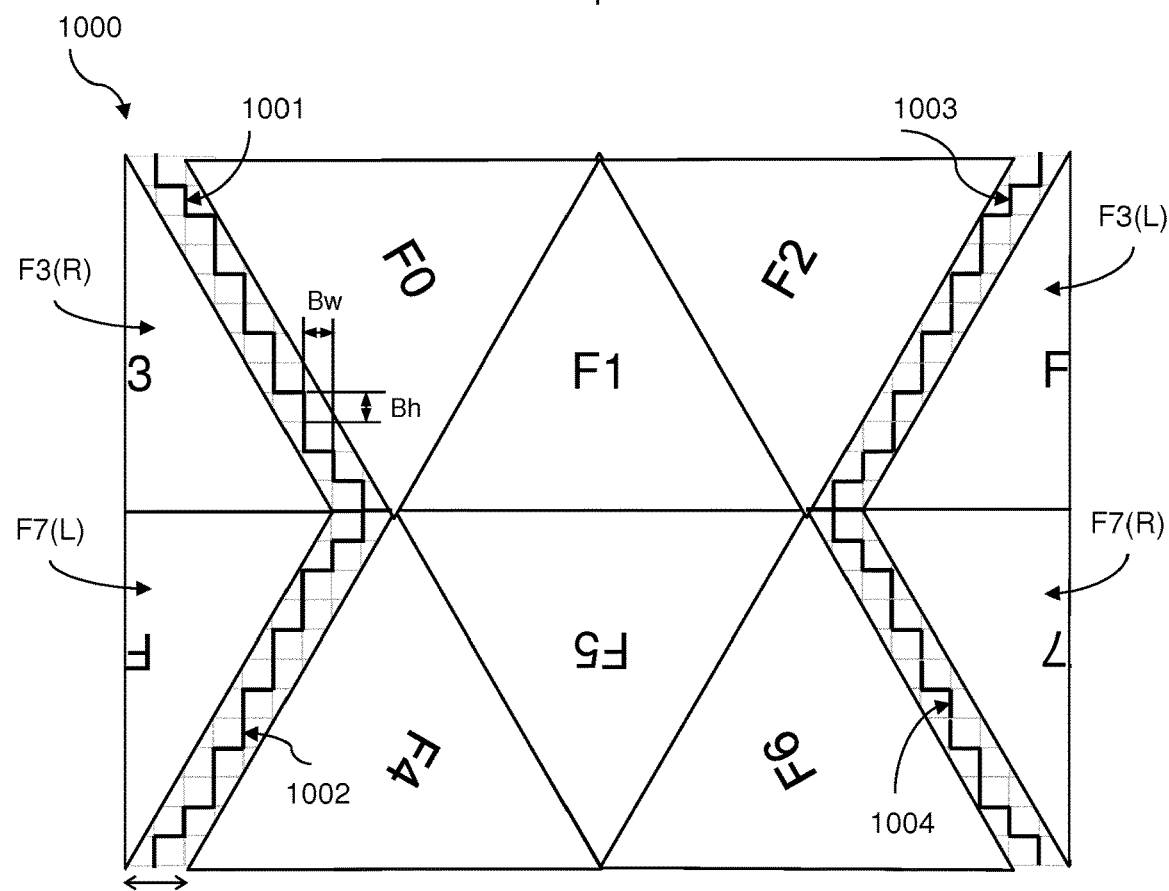
FIG. 10 illustrates a boundary portion extension of an OHP-based projection according to embodiments of the present invention.

Variants may contemplate extending straight boundaries or straight segments forming a boundary of the projection subpart, e.g. an edge of a triangle obtained from OHP or ISP projection technique, or even an edge of a face obtained with CMP (because discontinuity exists between the top row and the bottom row). FIG. 10 illustrates the case of OHP.

FIG. 9 focuses on one of pole faces F0 and F1 of the SSP projection where the active area of the face is represented by the area 900 inside the circle of radius R. This active area is the projection subpart of the 2D image on which the pole is usually projected. In contrast, the inactive area represents the surface outside the circle of radius R until the edge of the squared 2D image.

The illustrated embodiment proposes to introduce an extending portion at the boundary (here a circular portion with radius R) of the active area, within the inactive area in order to better exploit the fact that a majority of video encoders use block structures for prediction and not circular structures.

As show in the Figure, an outward strip 910 along the boundary portion (circle) is obtained within the inactive area. For instance, the outward strip is defined between the circular portion and an outer circular portion (having the same centre) with radius $R_E$ higher than R (see FIG. 9a).

Radius $R_E$ is a parameter that can be adjusted depending on the selected video encoder.

Preferably, $R_E$ belongs to ]R; A.R], where A is at most 1.1. Indeed, experiments made by the inventors have shown that enhanced results are obtained when $R<R_E \leq A.R$. It is noted that a higher value of A is counterproductive as the coding efficiency compromise will be worse. This is because adding further information far from the border of the active area (circle R) will not help having prediction improved and thus compression improved. On the contrary, the additional information needs to be encoded (thus using additional bits) with no benefit at the decoder side for reconstruction quality.

The determination of A may be made in advance for instance per each type of image: camera-captures image, screen content image, etc. Various values of $R_E$ may be tested for a set of images having the same type, and a measure, such as a rate/distortion measure, may be obtained (between the original image and a reconstructed image). The value A may thus correspond to one tested value of $R_E$ between the one where the rate/distortion measure is maximum and the one where the rate/distortion measure falls below the one obtained without the invention (i.e. if $R_E$=R).

For instance, the inventors have found that the maximum rate/distortion is obtained for A=1.06 for Luma components, with an optimal block size of 32×32 pixels, and for A=1.05 for Chroma components, with an optimal block size of 16×16 pixels.

The choice of $R_E$ in this range for a given image can be made by testing each value available, for instance by an 0.01 increment.

More generally, the outward strip may be defined along the boundary portion (i.e. with the same shape) to have a predefined width ($R_E$–R in the above example or 32 pixels for instance), or to have a maximum width less or equal to the diagonal of the largest block (64×64 pixels in HEVC for instance) in the block structure.

Next, blocks of the block structure having pixels in the outward strip are determined. The extended block-based boundary portion may thus be based on the determined blocks. For instance, the extended block-based boundary portion is defined by the outer, with respect to the projection subpart, edges of the determined blocks. To limit the size of the extending portion, only blocks that do not overlap outside the strip in the inactive area may be considered in the extending portion.

Figure 9B:
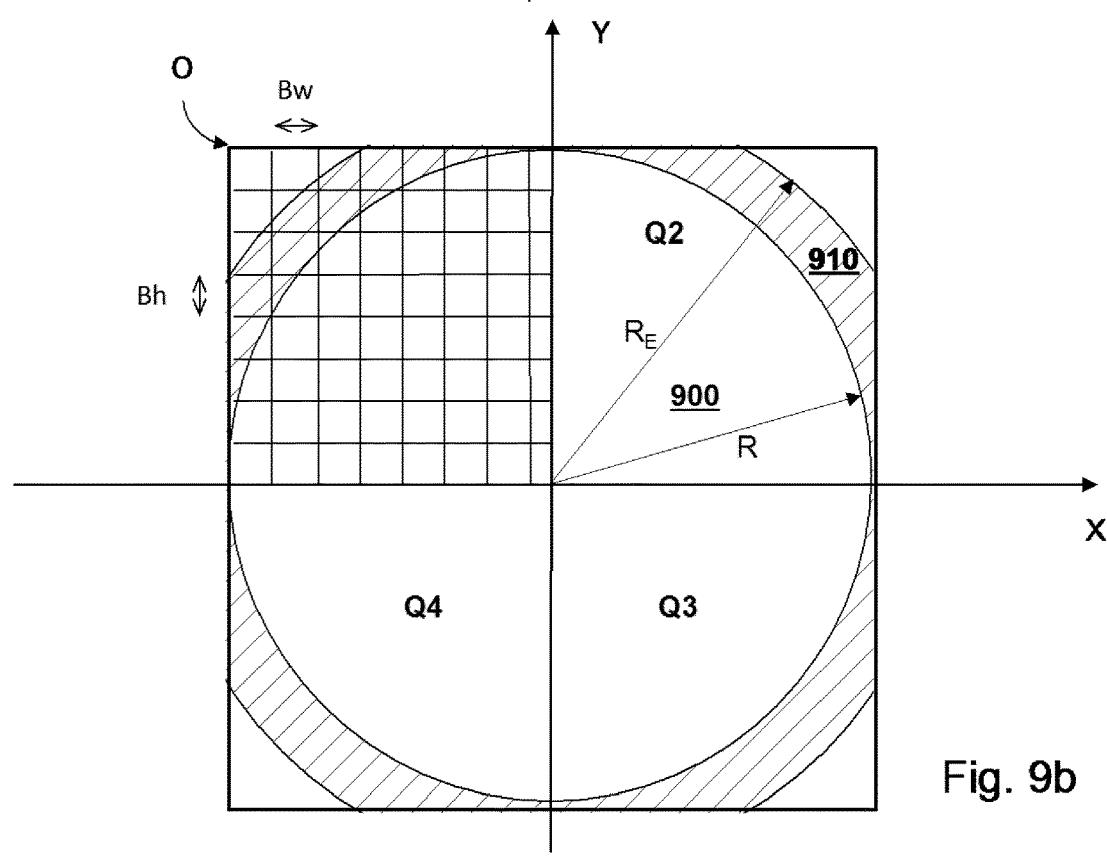

For example, regarding quarter Q1 of FIG. 9, the block structure of the encoder is superimposed (dashed grid) on Q1 using the same grid origin O (see FIG. 9b).

The size Bw×Bh of the blocks in the block structure may be adjusted according to the video codec used (to match the same block structure). However, most of the time for H.264 or HEVC or the new video codec JEM under investigation, a squared block size where Bw=Bh is in the range of [8 to 64] (preferably a power of 2) gives the best subjective and objective result.

Of course, the blocks could be rectangular, where Bw and Bh has different values.

One may also contemplate having different sizes of blocks in the different quarters Q1-Q4 (more generally in two separate inactive areas of the 2D image). Also one may contemplate having different block sizes Bw and Bh according to the location of the blocks in the quarter(s) they belong to.

Figure 9C:
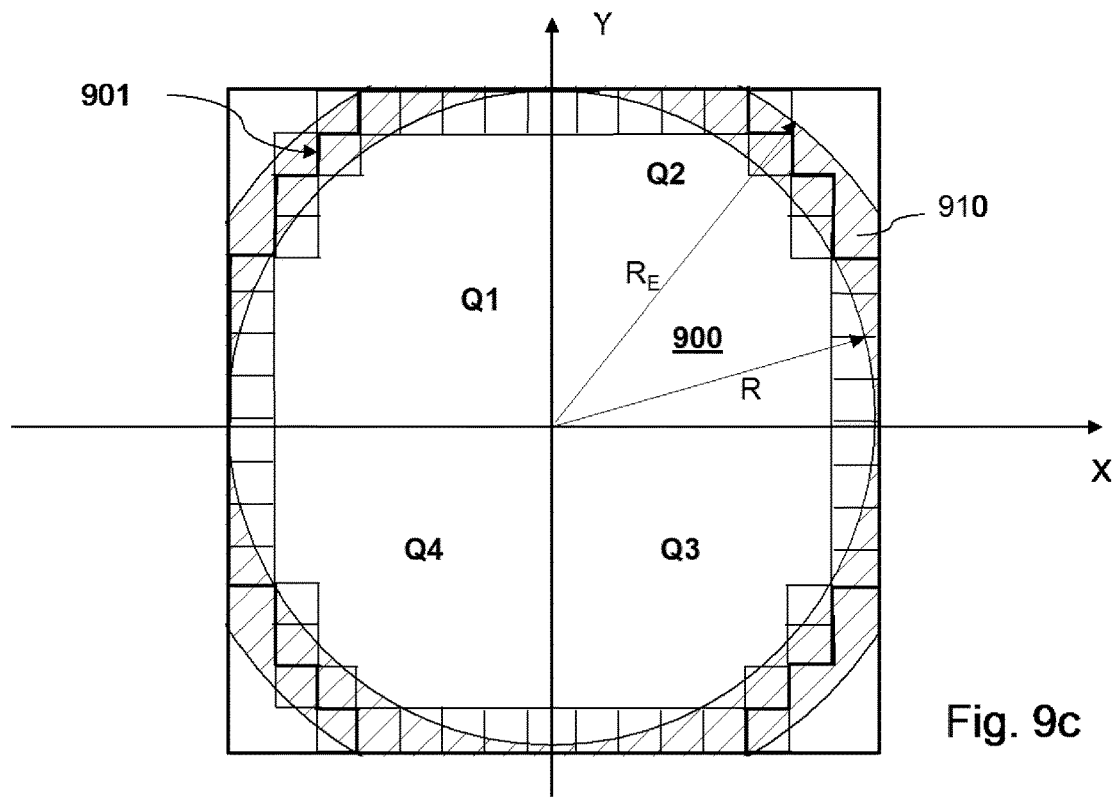

The blocks to form the extending portion are thus determined. As illustrated in FIG. 9c, the determined blocks are those delimited by the bold line. One can see that some of these blocks belong entirely to the extending portion (i.e. are fully new compared to the initial active area 900). Other blocks are partly formed from the initial active area 900 and from the inactive area 910. There are said to be overlapping the active and inactive areas.

In this example, no block overlapping the outward strip 910 and the outer part of the inactive area are kept for the extending portion: all kept blocks are fully included in the circle having radius $R_E$ (i.e. included in active part 900 supplemented with strip 910). They are blocks overlapping (partially or fully) the outward strip while not extending beyond the outer edge of the outward strip.

Different approaches may however be used to determine the blocks to form the extending portion. One approach as illustrated may consist in selecting all the blocks fully included in the circle having radius $R_E$ (regardless of whether they overlap the active area 900 or not). Another approach may consist in selecting only blocks that overlap the active area 900. This is to reduce the number of additional blocks. Only the incomplete blocks of the active area (incomplete due to the shift between the active area boundary and the block structure) are modified to provide more homogenous blocks, better adapted for compression and artefact reduction.

Regarding the first approach proposed as illustrated in the Figure, a block in Q1 of the 2D image is selected to be included in the extending portion if the top left corner of the block is located between radius R and radius $R_E$.

Similar conditions are implemented for the other quarters of this illustrative example:

a block in Q2 is selected to be included in the extending portion if the top right corner of the block is located between radius R and radius $R_E$;

a block in Q3 is selected to be included in the extending portion if the bottom right corner of the block is located between radius R and radius $R_E$;

a block in Q4 is selected to be included in the extending portion if the bottom left corner of the block is located between radius R and radius $R_E$.

The block structures to be superimposed on each quarter may have the same origin O, but may also have different origins according to the quarter being processed.

Bold line 901 defining the outer limits of the extended block-based boundary portion is thus defined by the outer (with respect to the active area) edges of the selected blocks.

One may see that the resulting extended block-based boundary portion (bold line 901) is crenelated due to the following of the block edges.

The padding pixels to be set according to any pixel-setting approaches described above are those inactive pixels that belong to the extended block-based boundary portion (i.e. to the extending portion).

The above has been explained when considering pixels as a whole. One knows that pixels of the spherical 360-degree image are often made of at least two (usually three) colour components. In that case, different extended block-based boundary portions may be generated for the two colour components from the same boundary portion of the projection subpart.

For instance, it may means that on one hand the Luma component and on the other hand the Chroma components may have different parameters to perform the boundary portion extension according to the sampling of the Chroma components in the original 360-degree video. For example, a value of $A_L$ could be used for A in case of the Luma component while a value of $A_C$ could be used for A in case of the U and V Chroma components.

The above has been mainly presented with relation to SSP. The same teachings apply to RSP where half-circle active areas are obtained.

Turning now to FIG. 10 which illustrates the case of OHP where the 2D image includes a plurality of projection subparts (faces) to receive projected faces of the spherical 360-degree image, the boundary portions of two projection subparts are extended to the same extended block-based boundary portion. In the present example, the active areas made of face F0 and face F3 (more precisely right part F3(R) of it) are separated by an E-width inactive area to avoid seam artefacts due to discontinuities between the two faces. The two active areas are extended up to same block-based line 1001 (bold line) splitting the inactive area into two parts.

Parameter E may be adjusted by the encoder, in which case its value is transmitted to the decoder in bitstream 109 (or via another communication channel). The choice of E may be based on a bitrate/distortion criterion and/or on a similarity measure between the two edges (pixels in the active area) on both sides of the E-width inactive area.

Similarly, the active areas made of face F4 and face F7 (more precisely left part F7(L) of it) are extended up to same block-based line 1002. The active areas made of face F2 and face F3 (more precisely left part F3(L) of it) are extended up to same block-based line 1003. The active areas made of face F6 and face F7 (more precisely right part F7(R) of it) are extended up to same block-based line 1004.

One may notice again that the resulting extended block-based boundary portion (bold line 1001 to 1004) is crenelated due to the following of the block edges. While square blocks are shown, any Bw×Bh rectangular structure may be used.

The same origin between the block structure of the video encoder and the block structure for the boundary portion extensions can be used, in order to align both structures for better coding efficiency. Of course, they may also be different when considering the inactive area between F0 and F3(R), F4 and F7(L), F6 and F7(R) and F2 and F3(L).

In a similar way to the SSP or RSP projection, the inactive pixels of the OHP projection can be calculated as the continuation of the projection until reaching the "ladder shape" frontier represented by bold lines 1001-1004. Of course, the other pixel-setting approaches described above may be used.

This approach of FIG. 10 can be extended to any other projection format where the active area boundaries are made of straight segments (e.g. CMP).

The inventors have observed substantial improvements in coding efficiency thanks to the invention.

Quality of compression can be evaluated using different metrics. Three different types of distortion measurement and several formulas are described below. Additional details may be found in already-cited publication "Algorithm descriptions of projection format conversion and video quality metrics in 360Lib".

First distortion measure is known as the "end-to-end distortion". The end-to-end distortion is calculated between the original signal (here original 360-degree video) in source projection format and the reconstructed signal in source projection format. The end-to-end distortion considers both projection format conversion errors (including forward and backward projection format conversion) and coding errors. The following measures are considered for that category: WS-PSNR, CPP-PSNR, S-PSNR-I and S-PSNR-NN, where:

the Weighted to Spherically PSNR (WS-PSNR) computes the distortion at each sample position. This distortion is weighted by the area on the sphere covered by the given sample position. All samples on the 2D projection plane are used in WS-PSNR calculation. The two inputs to the metric calculation must have the same resolution and projection format;

the Craster Parabolic Projection (CPP-PSNR) applies another projection format conversion to convert the two inputs into the Craster Parabolic Projection domain, and calculate PSNR in CPP domain. The two inputs to the metric calculation can have different resolutions and projection formats;

the Spherical PSNR NN (S-PSNR-NN) calculates PSNR based on a set of points uniformly sampled on the sphere. To find the sample value at the corresponding position on the projection plane, nearest neighbour rounding is applied. The two inputs to the metric calculation can have different resolutions and projection formats;

the Spherical PSNR I (S-PSNR-I) calculates PSNR based on a set of points uniformly sampled on the sphere. To find the sample value at the corresponding position on the projection plane, bi-cubic interpolation is applied. The two inputs to the metric calculation can have different resolutions and/or projection formats.

Second distortion measure is known as the "cross-format distortion". The cross-format distortion is measured between the original signal in source projection format (most of the time provided in ERP format) and the reconstructed signal in coding projection format (hence the name "cross-format"). Partial (only forward) projection format conversion errors and coding errors are measured. The following measures are considered for that category CPP-PSNR, S-PSNR-I and S-PSNR-NN.

Last and third distortion measure is known as the "codec distortion". The coding distortion is measured between the input to the codec and the output of the codec. Only coding errors are measured, and projection format conversion errors are not measured. The following measures are considered for that category: WS-PSNR and PSNR which is the conventional PSNR calculation with equal weight for all samples.

The inventors have conducted an experiment consisting in encoding ten 360-degree video sequences with the boundary portion extension of the present invention, in case of SSP projection (see FIG. 9) where $R_E=1.06 \times R$ for Luma components and $R_E=1.05 \times R$ for Chroma components.

The overall gains (because negative figures according to the Bjontegaard measure described in "Calculation of average PSNR differences between RD-Curves", ITU-T SG16 Q.6 Document, VCEG-M33, Austin, US, April 2001) in compression are shown in the table below for each colour component Y, U, V, given various distortion metrics.

| SPSNR-NN (End to end) | | | SPSNR-I (End to end) | | | CPP-PSNR (End to end) | | | WS-PSNR (End to End) | | |
|---|---|---|---|---|---|---|---|---|---|---|---|
| Y | U | V | Y | U | V | Y | U | V | Y | U | V |
| −0.5% | −2.3% | −1.7% | −0.5% | −2.3% | −1.7% | −0.6% | −2.2% | −1.7% | −0.6% | −2.5% | −1.8% |
| SPSNR-NN (Cross format) | | | SPSNR-I (Cross format) | | | CPP-PSNR (Cross format) | | | WS-PSNR (Codec) | | |
| Y | U | V | Y | U | V | Y | U | V | Y | U | V |
| −0.6% | −3.0% | −2.1% | −0.5% | −2.5% | −1.8% | −0.6% | −2.7% | −1.9% | −0.5% | −2.5% | −1.6% |

This table shows that for all the metrics considered, a better quality for a similar bit rate is achieved when the present invention is implemented.

On average, the proposed SSP-based boundary extension method provides better coding efficiency ranging from 0.5% to 0.7% for the Luma components and from 1.6% to 3.6% on Chroma components. The comparison is made to SSP with no extension at all.

The visual seam artefacts of the SSP projection are also either removed or substantially reduced with the present invention.

The proposed boundary portion extension for the 3D-to-2D projection (as described above for SSP, RSP and OHP) is only applied for the conversion from the 3D domain to the 2D domain.

Fortunately, for some projection formats (e.g. SSP and RSP), there is no need to take into account the padding pixels added at the decoder side for video reconstruction. Indeed, the 2D-to-3D conversion at the decoder only uses the pixels considered in the active area for generating the spherical 360-degree video representation.

For other projection formats, for instance OHP described above (but extendable at least to ISP and CMP), the decoder may know the value of the inactive area width, i.e. the value of parameter E. It is for the decoder to know exactly where each projection subarea (triangle for OHP/ISP or rectangle/square for CMP) is located in the decoded 2D image.

This value of E may be fixed and known by the decoder without for the encoder to send it. Alternatively, the value of E may be adjusted by the encoder in which case the latter transmits it to the decoder, for instance embedded in bitstream 109.

Embodiments of the invention thus provide a method of decoding bitstream 109 obtained above into a spherical 360-degree video in a decoding device, comprising the following steps performed by a microprocessor of the decoding device:

decoding, from the bitstream, a 2D image. This may be done using conventional video codecs;

obtaining, from the bitstream, an inactive area parameter, for instance parameter E defining a width of a strip of pixels between two projection subparts;

determining, within the decoded 2D image, locations of two or more projection subparts using the obtained strip width parameter. With reference to FIG. 10 for instance, it may consist in finding the exact locations of the vertices of triangles F1-F2 and F4-F6, as well as the exact location of F3(L) and F7(R), because all of them depends on the strip width E (the same could be performed for triangles in ISP and squares in CMP for instance), and projecting (2D-to-3D projection) the two or more located projection subparts onto a spherical 360-degree image.

The projection format to be used may also be retrieved from the bitstream.

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of encoding a spherical 360-degree video in an encoding device, the method being performed by one or more processors of the encoding device and comprising:
   projecting a spherical 360-degree image onto a 2D image including a plurality of projected parts, wherein the plurality of projected parts includes a circular projected part,
   extending, within the 2D image, a circular boundary portion of the circular projected part,
   encoding the 2D image in which the boundary portion is extended with a block-based encoder using a block structure;
   wherein the circular boundary portion of the circular projected part is extended into a block based boundary portion aligned with the block structure used by the block-based encoder.

2. The method of claim 1, further comprising:
   obtaining an outward strip along the boundary portion,
   determining blocks of the block structure having pixels in the outward strip, and
   defining the block-based boundary portion corresponding to the determined blocks.

3. The method of claim 2, wherein determining blocks of the block structure includes determining blocks that overlap the outward strip while not extending beyond the outer edge of the outward strip.

4. The method of claim 2, wherein the block-based boundary portion is defined by the outer, with respect to the circular projected part, edges of the determined blocks.

5. The method of claim 2, wherein the boundary portion is a circular portion with radius R, and the outward strip is defined between the circular portion and an outer circular portion with radius $R_E$ higher than R.

6. The method of claim 5, wherein $R_E$ is such that $R < R_E \leq A.R$, where A.R corresponds to "A times R", where A is at most 1.1.

7. The method of claim 2, wherein the outward strip is defined along the boundary portion to have a maximum width less or equal to the diagonal of the largest block in the block structure.

8. The method of claim 1, wherein the 2D image includes two circular projected parts to receive projected faces of the spherical 360-degree image, and
   the boundary portions of the two circular projected parts are extended to the same block-based boundary portion.

9. The method of claim 1, wherein an extending portion of the 2D image defined between the boundary portion and the block-based boundary portion is filled in with projected data continuing the projection of the spherical 360-degree image onto the circular projected part.

10. The method of claim 9, further comprising low-pass filtering the extending portion so filled in.

11. The method of claim 1, wherein pixels of a block in an extending portion of the 2D image defined between the boundary portion and the block-based boundary portion are set to a constant pixel value equal to a pixel value of the circular projected part within the same block or within an adjacent block.

12. The method of claim 1, wherein an extending portion of the 2D image defined between the boundary portion and the block-based boundary portion is filled in using interpolation of adjacent pixels, for instance along horizontal or vertical or radial, if any, direction.

13. The method of claim 1, wherein the boundary portion is a circular portion surrounding an at least partly circular projected part of the 2D image, for example a circular projected part.

14. The method of claim 1, wherein the boundary portion is made of one or more straight segments forming a boundary of the circular projected part.

15. The method of claim 1, wherein pixels of the spherical 360-degree image are made of at least two colour components, and different block-based boundary portions are generated for the two colour components from the same boundary portion of the circular projected part.

16. The method of claim 1, wherein blocks used to define the block-based boundary portion are square or rectangular blocks, the widths of which are selected from 8-pixel width, 16-pixel width, 32-pixel width and 64-pixel width.

17. A method of decoding a bitstream, into a spherical 360-degree video in a decoding device, the method being performed by one or more processors of the decoding device and comprising:

decoding, from a bitstream encoding a spherical 360-degree video according to claim 1, a 2D image; and
reverse projecting the 2D image, including two or more decoded circular projected parts, onto a spherical 360-degree image.

18. The method of claim 17, wherein the inactive area parameter defines a width of a strip of pixels between two circular projected parts.

19. A device for encoding a spherical 360-degree video, the device comprising one or more processors configured for:
   projecting a spherical 360-degree image onto a circular projected part of a 2D image,
   extending, within the 2D image, a circular boundary portion of the circular projected part,
   encoding the 2D image in which the boundary portion is extended, by using a block-based encoder using a block structure;
   wherein the circular boundary portion of the circular projected part is extended into a block based boundary portion aligned with the block structure used by the block-based encoder.

20. A device for decoding a bitstream, into a spherical 360-degree video in a decoding device, the device comprising one or more processors configured for:
   decoding, from the bitstream, a 2D image;
   obtaining, from the bitstream, an inactive area parameter;
   determining, within the decoded 2D image, locations of two or more circular projected parts using the obtained inactive area parameter, and
   projecting the two or more located circular projected parts onto a spherical 360-degree image.

21. A non-transitory computer-readable medium storing a program which, when executed by one or more processors or computer system in a device, causes the device to:
   project a spherical 360-degree image onto a 2D image including a plurality of projected parts, wherein the plurality of projected parts includes a circular projected part,
   extend, within the 2D image, a circular boundary portion of the circular projected part, and
   encode the 2D image in which the boundary portion is extended by using a block-based encoder using a block structure;
   wherein the circular boundary portion of the circular projected part is extended into a block based boundary portion aligned with the block structure used by the block-based encoder.

22. A non-transitory computer-readable medium storing a program which, when executed by one or more processors or computer system in a device, causes the device to:
   decode, from the bitstream, a 2D image;
   obtain, from the bitstream, an inactive area parameter;
   determine, within the decoded 2D image, locations of two or more circular projected parts using the obtained inactive area parameter, and
   project the two or more located circular projected parts onto a spherical 360-degree image.

* * * * *